United States Patent
Monahan

(10) Patent No.: US 9,066,471 B1
(45) Date of Patent: Jun. 30, 2015

(54) APPARATUS AND METHOD FOR A BALER CART

(71) Applicant: Daniel Kent Monahan, Plainview, MN (US)

(72) Inventor: Daniel Kent Monahan, Plainview, MN (US)

( * ) Notice: Subject to any disclaimer, the term of this patent is extended or adjusted under 35 U.S.C. 154(b) by 141 days.

(21) Appl. No.: 13/795,714

(22) Filed: Mar. 12, 2013

Related U.S. Application Data

(60) Provisional application No. 61/621,726, filed on Apr. 9, 2012.

(51) Int. Cl.
- *A01D 90/08* (2006.01)
- *B60P 1/44* (2006.01)
- *B60P 1/36* (2006.01)

(52) U.S. Cl.
CPC .............. *A01D 90/083* (2013.01); *A01D 90/08* (2013.01); *B60P 1/44* (2013.01); *B60P 1/36* (2013.01)

(58) Field of Classification Search
USPC ......... 100/88; 280/492, 494; 298/22 C, 26, 5, 298/6; 403/141; 414/111, 24.5, 477, 480, 414/501, 517, 789.7; 460/119; 56/16.4 R, 56/341, 473.5, 474, 475, 477, 479, 480, 56/DIG. 14
See application file for complete search history.

(56) References Cited

U.S. PATENT DOCUMENTS

| | | | |
|---|---|---|---|
| 3,675,802 A * | 7/1972 | Best et al. ...................... 414/503 |
| 3,998,471 A * | 12/1976 | Lutchemeier ................. 280/492 |
| 4,386,493 A | 6/1983 | Holdeman et al. |
| 4,534,285 A | 8/1985 | Underhill |
| 4,633,659 A | 1/1987 | Anstey et al. |
| 4,742,880 A | 5/1988 | Schrag et al. |
| 4,815,266 A | 3/1989 | Ratzlaff et al. |
| 4,844,675 A * | 7/1989 | Strosser et al. ............... 414/111 |
| 5,046,918 A * | 9/1991 | Berlivet et al. ............ 414/789.7 |
| 5,295,776 A * | 3/1994 | Meijer .......................... 414/111 |
| 5,511,921 A * | 4/1996 | Meijer ......................... 414/24.5 |
| 5,664,923 A * | 9/1997 | Olin ............................ 414/24.5 |
| 5,822,967 A | 10/1998 | Hood et al. |
| 5,842,823 A * | 12/1998 | Kohnen et al. ................ 414/111 |
| 6,019,562 A * | 2/2000 | Cheatham ..................... 414/111 |
| 6,145,855 A * | 11/2000 | Bellis, Jr. ..................... 280/32.7 |
| 6,240,712 B1 | 6/2001 | Meijer et al. |
| 6,250,663 B1 * | 6/2001 | Maloy .......................... 280/492 |
| 6,421,996 B1 | 7/2002 | Deutsch et al. |
| 6,616,103 B2 * | 9/2003 | Marrero ..................... 244/137.1 |
| 7,000,371 B2 | 2/2006 | Viaud |
| 7,311,335 B2 | 12/2007 | Muhs et al. |

(Continued)

*Primary Examiner* — Gregory Adams
(74) *Attorney, Agent, or Firm* — Jonathan M. Rixen; Lemaire Patent Law Firm, P.L.L.C.

(57) ABSTRACT

A cart for collecting and unloading agricultural bales, the cart including a cart body; a hitch, wherein the hitch includes a first end that is configured to operatively connect to a baler and a second end that is configured to operatively connect to the cart body, wherein the hitch provides a pitch degree of freedom to the cart relative to the baler, and wherein the hitch provides a roll degree of freedom to the cart relative to the baler; an automated conveyor device operatively connected to the cart body and configured to move the agricultural bales to a back end of the cart body; and at least one swivel wheel operatively connected to the cart body. In some embodiments, the automated conveyor device includes an apron-chain conveyor powered by a hydraulic motor controlled by hydraulic valves in a cab of a tractor being used to pull the baler and cart.

20 Claims, 18 Drawing Sheets

(56) References Cited

U.S. PATENT DOCUMENTS

| | | |
|---|---|---|
| 2002/0090281 A1* | 7/2002 | Siebenga ................ 414/111 |
| 2008/0006512 A1* | 1/2008 | Kuhus ................ 198/670 |
| 2008/0041984 A1* | 2/2008 | Sauser et al. ................ 241/75 |
| 2008/0115731 A1 | 5/2008 | Walker |
| 2009/0017885 A1 | 1/2009 | Halls |
| 2009/0078410 A1* | 3/2009 | Krenek et al. ................ 166/244.1 |
| 2009/0288933 A1* | 11/2009 | DeMong ................ 198/810.04 |
| 2011/0076115 A1* | 3/2011 | Page et al. ................ 414/13 |

* cited by examiner

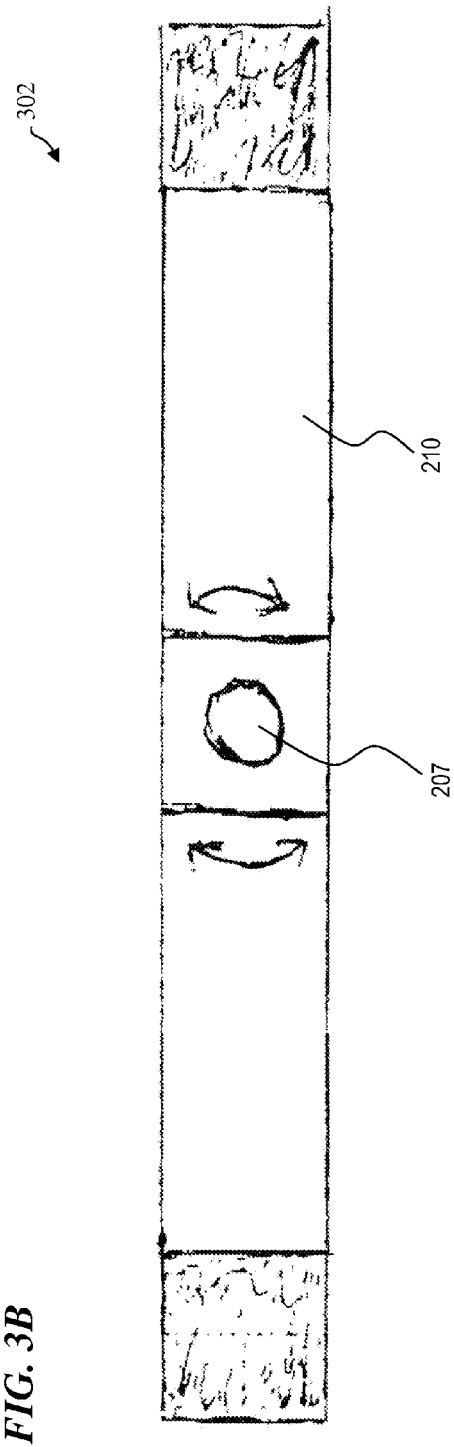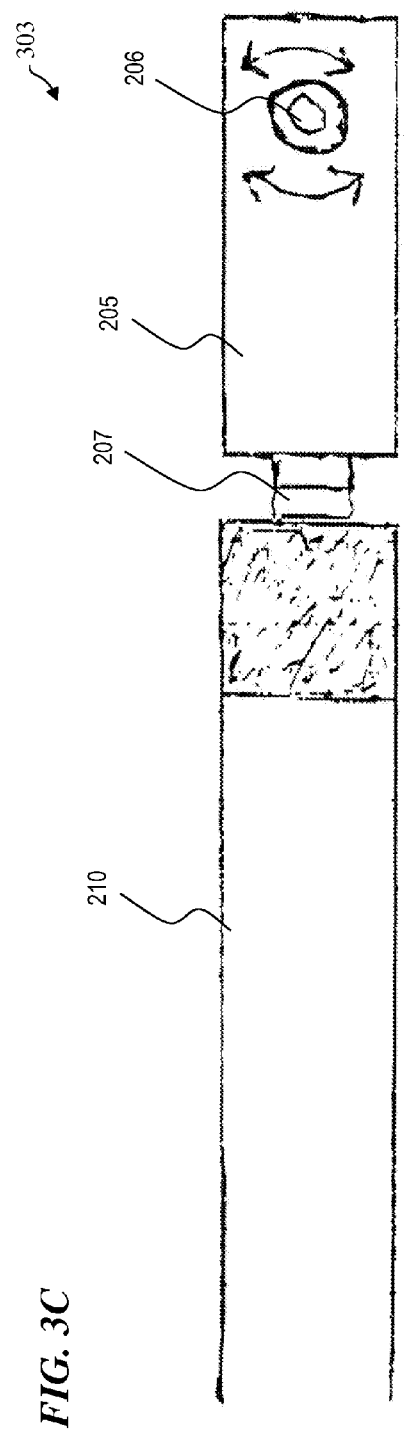
FIG. 3B
FIG. 3C

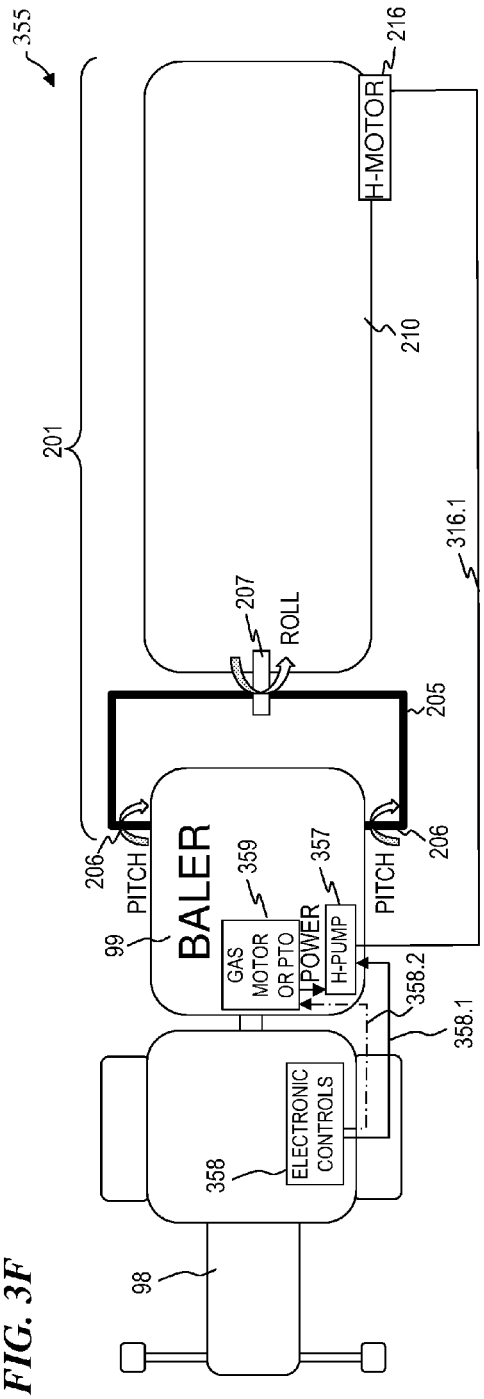
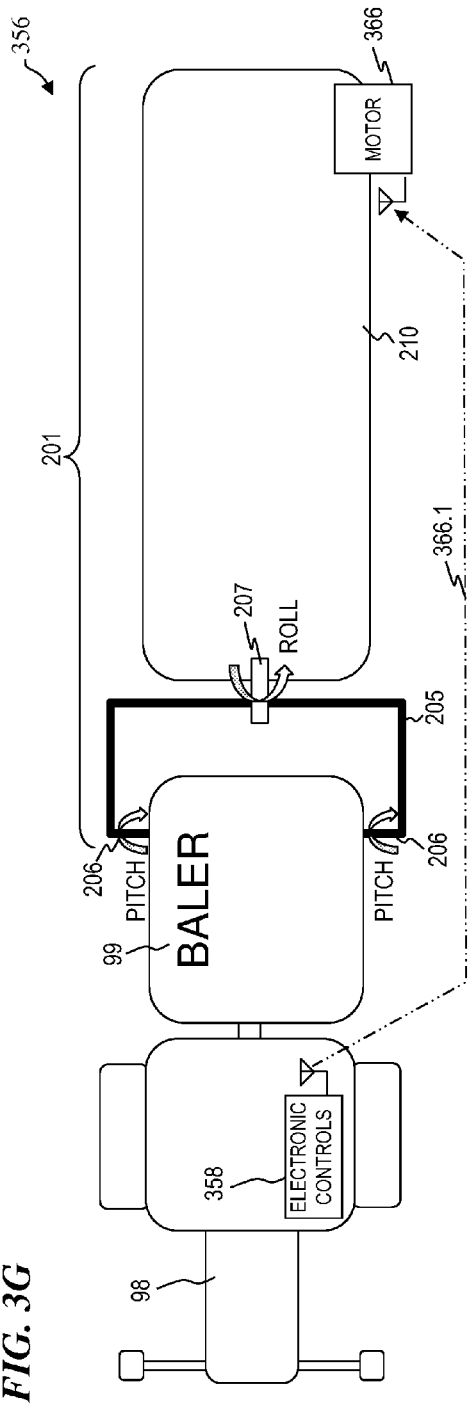
FIG. 3F
FIG. 3G

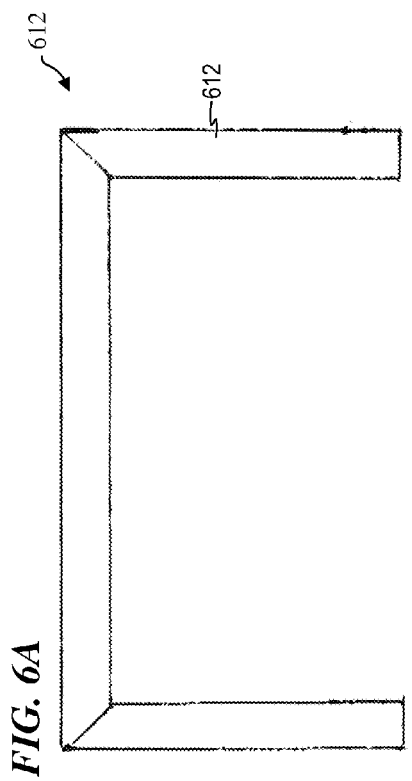
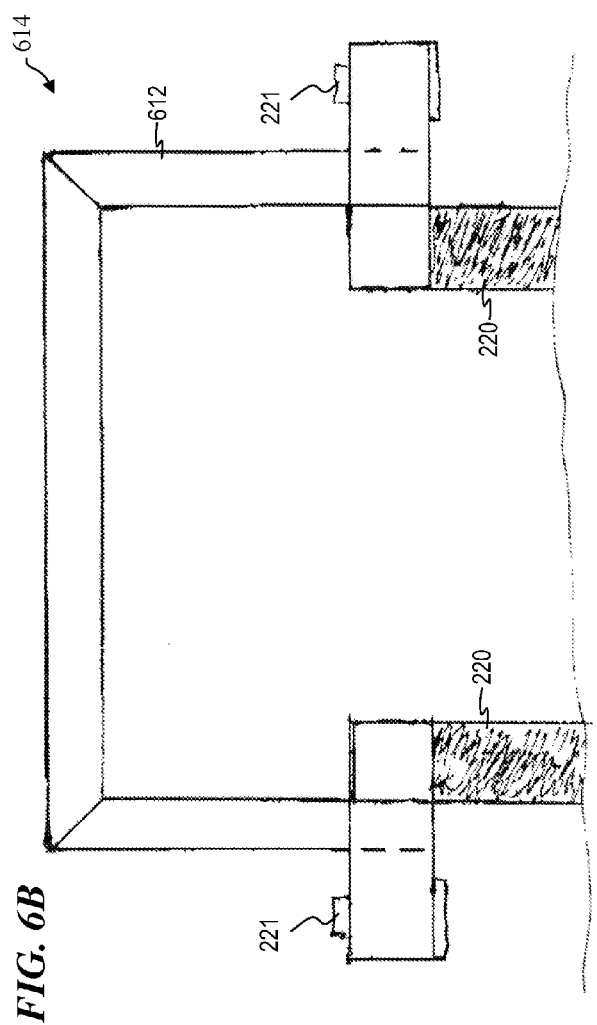
FIG. 6A
FIG. 6B

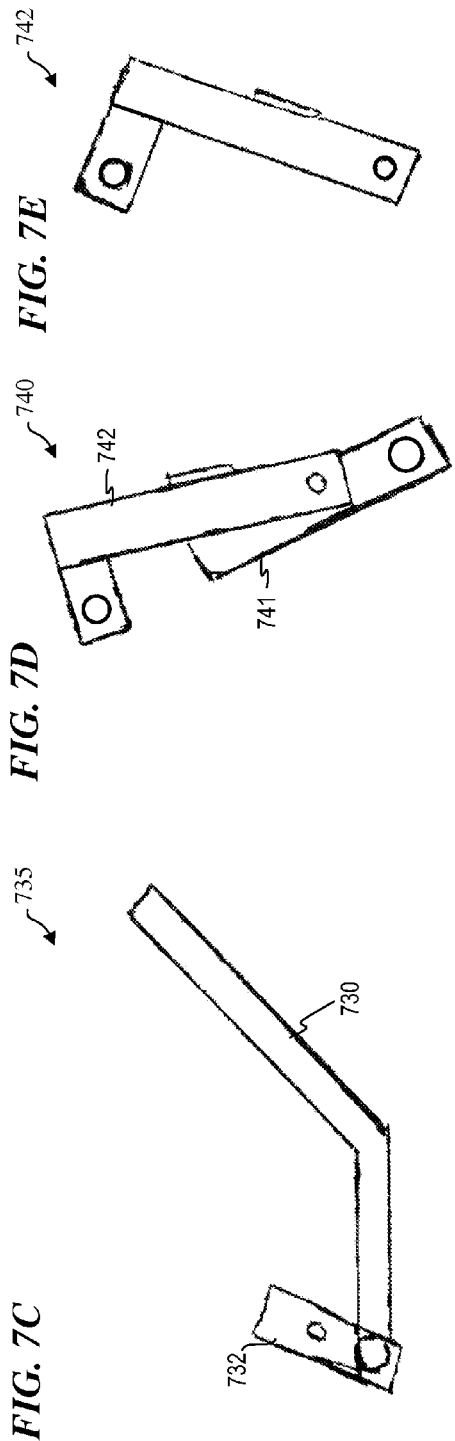
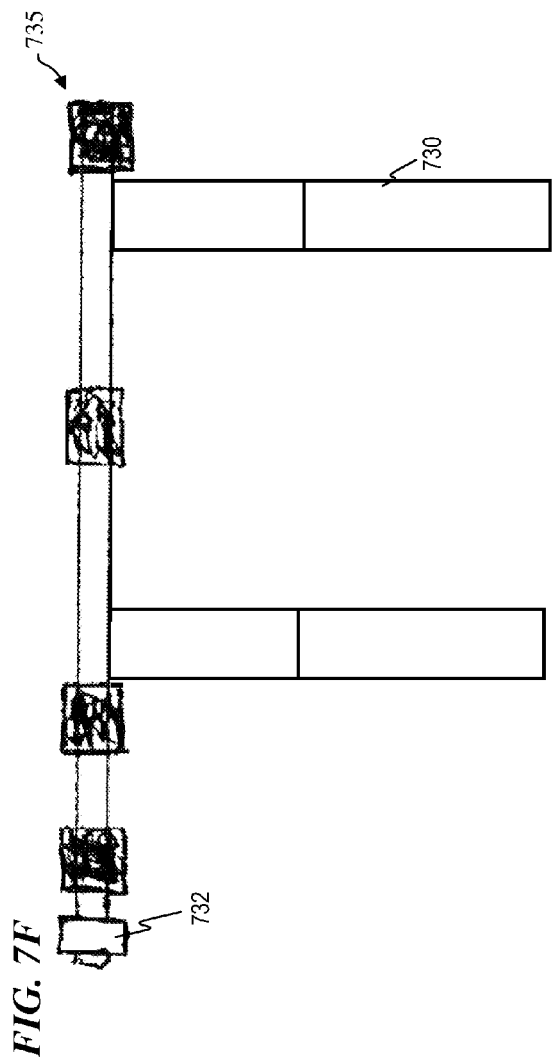
FIG. 7C
FIG. 7D
FIG. 7E
FIG. 7F

APPARATUS AND METHOD FOR A BALER CART

CROSS-REFERENCE TO RELATED APPLICATIONS

This application claims priority benefit under 35 U.S.C. §119(e) of Provisional Patent Application No. 61/621,726 filed Apr. 9, 2012 by Daniel Monahan, titled "APPARATUS AND METHOD FOR A BALER CART," which is incorporated herein by reference in its entirety.

FIELD OF THE INVENTION

This invention relates to the field of farm machinery, and more specifically to an apparatus and method for a baler cart.

BACKGROUND OF THE INVENTION

Large round bales are a popular package in which to store a variety of crop materials, ranging from alfalfa to corn stalks. The large cylindrical configuration and generally uniform density of the bales enhance their weathering characteristics, sometimes allowing the bales to remain in the field until needed. Additionally, the bales concentrate large quantities of crop material in individual packages, reducing the time required to gather and transport a given amount of crop material when needed. It is sometimes desirable to collect the round bales from the field to transport to a central storage area where a large number of bales can be covered (e.g., in a barn or under a tarpaulin).

Round balers are typically operated by discharging the completed round bale directly out of the baler onto the ground or discharging the completed round bale onto a trailer or cart attached to the baler that receives and holds completed round bales until the baler operator is ready to unload the bales from the trailer.

U.S. Pat. No. 4,386,493 to Holdeman et al. (hereinafter, "Holdeman et al."), titled "METHOD AND APPARATUS FOR MAKING LARGE ROUND CROP BALES", issued Jun. 7, 1983, and is incorporated herein by reference. Holdeman et al. describe a bale-forming machine that has a rolling mechanism that initially tumbles loose crop material forwardly between the mechanism and the ground as the machine advances along a windrow. Thereafter, the rolling material becomes confined off the ground in an elevated forming chamber as additional material is fed into the chamber and as the mechanism rolls the material into a bale. Upon reaching a predetermined size, the bale can be tied and then ejected from the chamber through the raised rear section of the machine.

U.S. Pat. No. 4,534,285 to Underhill (hereinafter, "Underhill"), titled "ACTUATOR MECHANISM FOR CONTINUOUS ROLL BALING MACHINE", issued Aug. 13, 1985, and is incorporated herein by reference. Underhill describes a machine for continuously forming roll bales of crop material has a lower apron and forward and rearward upper aprons cooperating to define front and rear bale forming chambers. Pivoting arms move the forward upper apron between various positions during bale formation. Ramps extend upwardly above the lower apron in an operative position, and the ramps are also movable to an inoperative position. An actuator mechanism is interconnected between the arms and the ramps to cause movement of the ramps between the operative and inoperative positions in response to movement of the forward upper apron between its various positions.

U.S. Pat. No. 4,633,659 to Anstey et al. (hereinafter, "Anstey et al."), titled "CYLINDRICAL BALE-FORMING PRESS", issued Jan. 6, 1987, and is incorporated herein by reference. Anstey et al. describe a press for forming cylindrical or round bales comprises sets of bands or belts which, in a conventional manner, define a chamber for forming a bale by rolling up, as well as a pickup designed to transfer harvest products gathered on the ground as far as a bale-forming chamber through an entry opening for the products, and a starting roller located on that side of the opening that is remote from the pickup. According to the invention, a scraper is arranged to cooperate with the starting roller in such a manner as to resist any rolling up of the harvest products around the roller. If the roller is a smooth circular section roller, the scraper may be stationary. It may be arranged in conjunction with fingers extending between the bands or belts as far as to the immediate vicinity of the starting roller on the side of the roller remote from the scraper. In the case of a noncircular starting roller, the scraper is mounted so as to be movable, especially pivotable. It may be resiliently urged towards the starting roller, or else be positively displaced by a driving mechanism.

U.S. Pat. No. 4,742,880 to Schrag et al. (hereinafter, "Schrag et al."), titled "METHOD AND APPARATUS FOR DETERMINING THE WEIGHT OF BALES ISSUING FROM A CROP BALER", issued May 10, 1988, and is incorporated herein by reference. Schrag et al. describe bales emanating from the discharge end of a baler are received on an accumulating trailer provided with a weighing scale that, in combination with an electrical system, automatically determines the weight of certain of the successively issuing bales and conveniently displays such weight to the operator in the cab of the towing vehicle so that the operator can monitor the quality and condition of bales prepared by the machine on an ongoing, non-stop basis. An onboard computer preferably forming a part of the electronic system controls the process and assures its accuracy, while also providing information such as the average weight of bales weighed since last resetting the system.

U.S. Pat. No. 4,815,266 to Ratzlaff et al. (hereinafter, "Ratzlaff et al."), titled "CONTINUOUS ROUND BALER WITH ACCUMULATING TRAILER", issued Mar. 28, 1989, and is incorporated herein by reference. Ratzlaff et al. describe a baler having a "vertical" bale starting chamber in which the upwardly moving rear belts and the downwardly moving front belts cooperate to tumble and roll incoming material into a bale. When the bale reaches full size in the expanded chamber, the bale is lifted while still in its chamber to a wrapping station where it continues to spin as a binding wrapper is applied. During the lifting of the finished bale and subsequent application of the wrapper, fresh material entering the continuously moving baler is confined beneath the finished bale in a new starting chamber, whereupon the cycle is repeated. As the new bale grows, a discharge ramp becomes formed by certain stretches of the belts and rollers to gravitationally discharge the wrapped bale from the baler without stopping advancement of the machine. An accumulating trailer is hitched to the baler in a position to receive bales from the discharge ramp as they gravitate down the same and to temporarily store the accumulated group of bales until the operator selects a site for dumping the bales.

U.S. Pat. No. 5,822,967 to Hood et al. (hereinafter, "Hood et al."), titled "BALER WITH SWING ARM BALE WRAPPER", issued Oct. 20, 1998, and is incorporated herein by reference. Hood et al. describe an apparatus for forming and wrapping round bales that includes a baler, arm structure, a cradle, and moving structure. The baler is for taking in a crop material, forming the crop material into a bale, and ejecting the bale. The arm structure is connected to the baler. The cradle is pivotably supported by the arm structure and is for holding the ejected bale. The cradle includes rotating structure for rotating the bale about a central axis of the bale. Moving structure is for providing relative movement between the baler and the cradle. Wrapping structure is supported by the baler and is adapted for holding wrapping material. The wrapping structure is movable around the bale and cooperates with the rotating structure to be capable of wrapping the bale with the wrapping material.

U.S. Pat. No. 6,240,712 to Meijer et al. (hereinafter, "Meijer et al."), titled "BALE COLLECTOR", issued Jun. 5, 2001, and is incorporated herein by reference. Meijer et al. describe a bale collector having a mobile frame for connecting behind a bale delivery device, such as a baler, by which round bales can be deposited at desired points on the land. The bale collector provides a storage place for a single round bale, a non-return element for preventing rolling back of the bale from the rear and a tilt control element connected between the frame and the rear bearing part for tilting a rear end of the rear bearing part between an upper position of a collecting state and a lower position of an unloading state.

U.S. Pat. No. 6,421,996 to Deutsch et al. (hereinafter, "Deutsch et al."), titled "HARVESTER WITH BALE FORMING CHAMBER HAVING A TRANSPORT MODE", issued Jul. 23, 2002, and is incorporated herein by reference. Deutsch et al. describe a harvester that includes an integral two-section baling device with the section movement designed to provide both a bale discharge function and a transport height reduction function. In one embodiment, one section of the device includes rollers which follow a downwardly sloped ramp as the sections are opened relative to each other. The sloped ramped additionally serves as a portion of a finished bale handler and bale support. In a second embodiment, an additional hydraulic cylinder system controls the downward movement of the opened sections towards the transport position. Existing baler functions are advantageously utilized to provide transport height reduction with a minimal amount of additional hardware, and the operator can switch between transport and operational modes quickly and easily.

U.S. Pat. No. 7,000,371 to Viaud (hereinafter, "Viaud"), titled "LARGE ROUND BALER COMBINED WITH A BALE PROCESSING ARRANGEMENT LOCATED FOR RECEIVING A FORMED BALE", issued Feb. 21, 2006, and is incorporated herein by reference. Viaud describes a large round baler equipped with a bale processing arrangement in the form of a bale wrapping arrangement. A wrapping table is mounted to a guide arrangement for guided movement between a bale-receiving position and bale wrapping and bale discharge positions. The guide arrangement includes two sections, one of which can be moved to a near vertical non-operating position so as to diminish the overall length of the baler and processing arrangement. The wrapping arm of the bale wrapping arrangement can be dismounted for an operating mode where formed bales are deposited directly on the ground by the wrapping table.

U.S. Pat. No. 7,311,335 to Muhs et al. (hereinafter, "Muhs et al."), titled "TRAILER AND FUEL TANK ASSEMBLY", issued Dec. 25, 2007, and is incorporated herein by reference. Muhs et al. describe a trailer and fuel tank assembly. The fuel tank preferably forms the body of the trailer. The fuel tank may include a recess in the top surface for receiving the motor and/or pump, which may lower the pump closer to the ground to increase the suction performance of the pump. The bottom surface of the fuel tank may be bowed upward. This may cause any contaminants in the fuel tank to collect along the edges of the tank. Drain ports, positioned near the edges of the tank, can then be used to drain the contaminants from the tank. To easily attach accessories to the trailer, one or more track bars may be mounted to the trailer body. The track bars preferably include an elongate channel and an elongate slot. By placing an insert inside of the channel and bolting the accessory to the insert through the longitudinally extending slot, the accessories can be easily attached to the trailer.

There is a need for a baler cart with an improved loading and unloading mechanism and enhanced maneuverability.

SUMMARY OF THE INVENTION

In some embodiments, the present invention provides a cart for collecting and unloading agricultural bales, the cart including a cart body; a hitch, wherein the hitch includes a first end that is configured to operatively connect to a baler and a second end that is configured to operatively connect to the cart body, wherein the hitch provides a pitch degree of freedom to the cart relative to the baler, and wherein the hitch provides a roll degree of freedom to the cart relative to the baler; an automated conveyor device operatively connected to the cart body and configured to move the agricultural bales to a back end of the cart body; and at least one wheel operatively connected to the cart body, wherein the at least one wheel is configured to swivel.

In some embodiments, the present invention provides a method for collecting and unloading agricultural bales, the method including providing a baler; providing a cart; operatively connecting the cart to the baler such that the cart has a roll degree of freedom relative to the baler and such that the cart has a pitch degree of freedom relative to the baler; discharging agricultural bales from the baler onto the cart; motorized conveying the bales toward a back end of the cart; and unloading the bales from the cart by motorized conveying the bales off of the cart.

BRIEF DESCRIPTION OF THE DRAWINGS

FIG. 3B is an end view of the front end of main frame 210 of cart 201 showing the roll degree of freedom 302 provided to main frame 210 and/or hitch 205 by bolster connection 207.

FIG. 3C is a side view of hitch 205 and main frame 210 showing the pitch degree of freedom 303 provided to hitch 205 and main frame 210 by pitch connection 206.

FIG. 3F is a plan view of a baler-cart system 355.

FIG. 3G is a plan view of a baler-cart system 356.

FIG. 6A is an end view of an overhead back-end frame 612 suitable for use with any of the baler cart or baler-cart systems described in the present application.

FIG. 6B is an end view of an overhead back-end frame configuration 614 suitable for use with any of the baler cart or baler-cart systems described in the present invention.

FIG. 7C is a side view of a tailgate configuration 735.

FIG. 7D is a side view of a tailgate lift configuration 740.

FIG. 7E is a side view of upper tailgate lift portion 742.

FIG. 7F is a plan view of tailgate configuration 735.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
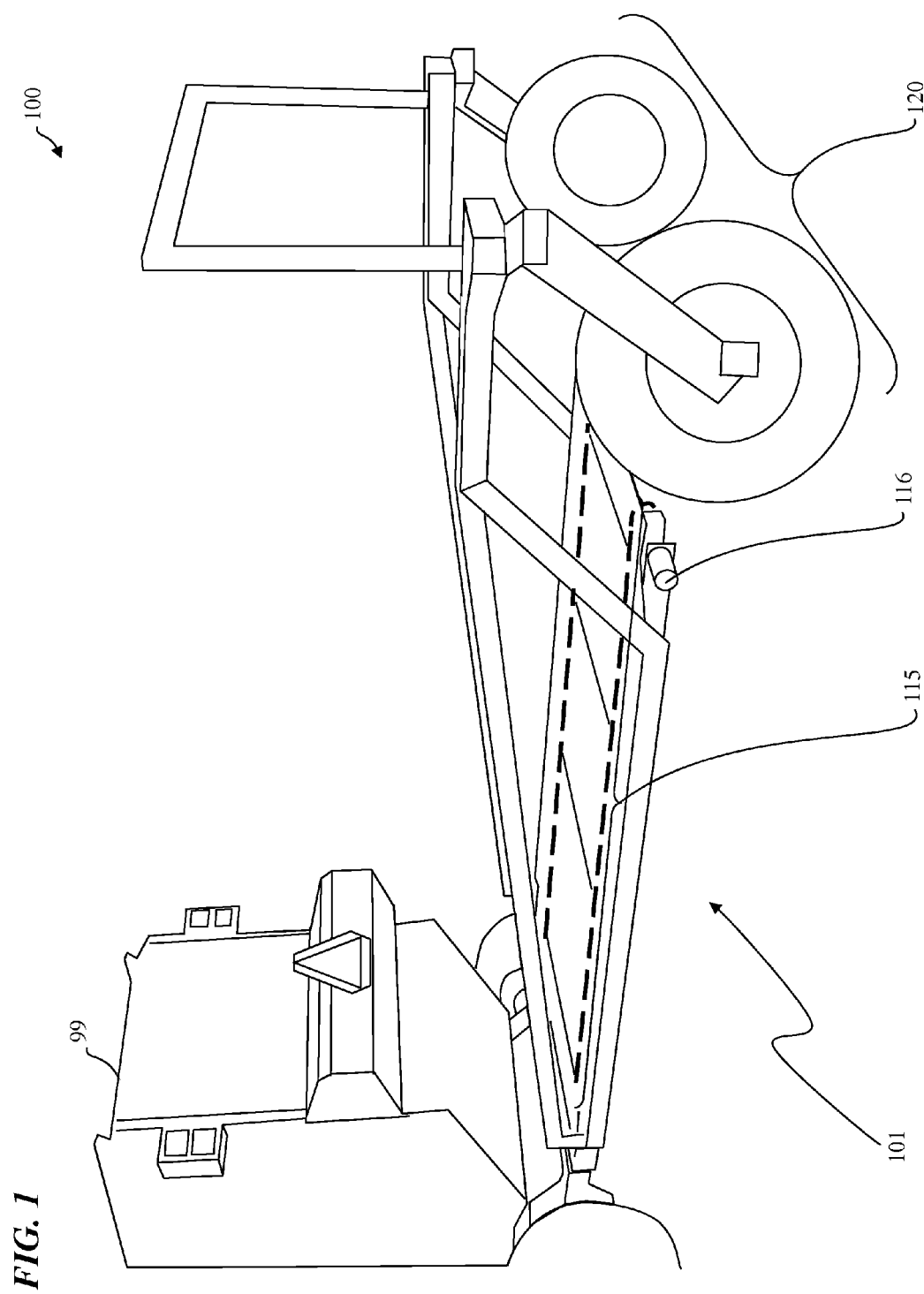
FIG. 1 is a perspective view of a baler-cart system 100.

FIG. 1 is a perspective view of a baler-cart system 100. In some embodiments, system 100 includes a baler cart 101 that is operably connected to the back end of a baler 99 (e.g., in some embodiments, a round baler such as a New Holland BR740 round baler by New Holland Agriculture, 120 Brubaker Avenue, New Holland, Pa. 17557; any suitable baler may be used with the present invention). In some embodiments, a tractor 98 is used to pull baler 99 through a field of cut and raked crop (e.g., hay, cotton, straw, silage, or the like) such that baler 99 picks up the crop and compresses it into compact bales (e.g., round bales). In some embodiments, one or more completed bales are discharged onto cart 101 and are stored on cart 101 until the operator of baler 99 is ready to unload the bales from cart 101. In some embodiments, the bales discharged onto cart 101 are moved toward the back end of cart 101 (e.g., in some embodiments, the bales are moved into a cradle formed by the frame of cart 101 and a hydraulically-driven tailgate) by an apron-chain conveyor 115 that is driven by a motor 116 (e.g., in some embodiments, a hydraulic orbit motor). In some embodiments, the bales are unloaded from cart 101 by lowering the tailgate of cart 101 (the tailgate is not shown in FIG. 1, but is shown in FIGS. 7A and 7C-7H) and using apron-chain conveyor 115 to move the bales off of the back end of cart 101. In some embodiments, cart 101 includes a pair of caster wheels 120 that are configured to swivel such that cart 101 can be easily turned and backed up.

Figure 2A:
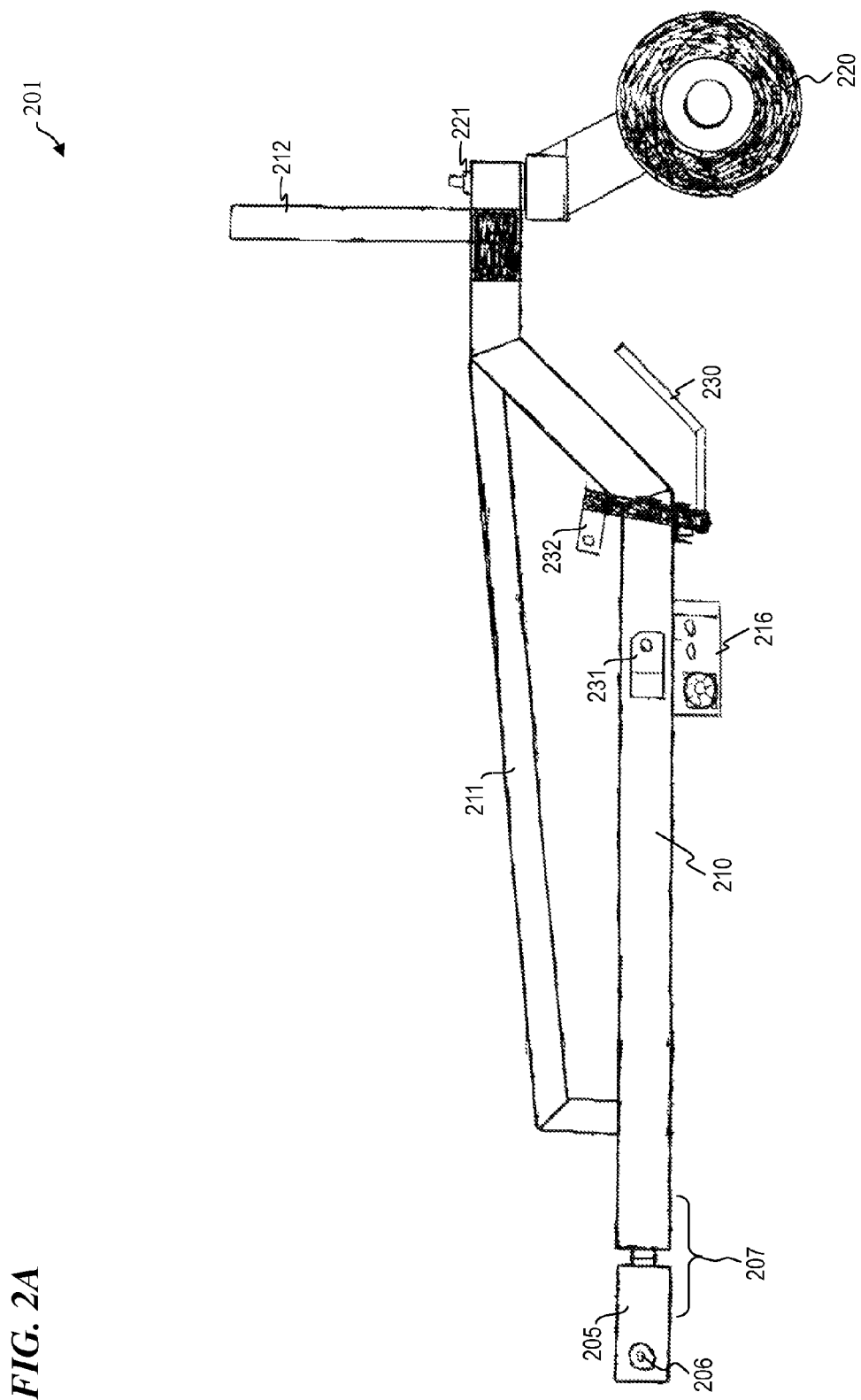
FIG. 2A is a side view of a baler cart 201.

FIG. 2A is a side view of a baler cart 201. In some embodiments, baler cart 201 is connected to baler 99 by hitch 205. In some embodiments, hitch 205 is configured to provide freedom of movement to baler cart 201 relative to baler 99 (see the pitch degree of freedom and the roll degree of freedom discussed below) such that baler cart 201 can closely follow the path that baler 99 takes and therefore such that bales can be discharged onto cart 201 from baler 99 even when baler 99 is being pulled over rough or hilly terrain. In some embodiments, hitch 205 is generally u-shaped such that hitch 205 includes two arm portions (e.g., a first arm portion and a second arm portion) that are parallel to the longitudinal axis of cart 201 (i.e., the axis that runs parallel to the direction of motion of the baler 99 and baler cart 201) and a third transverse portion that is perpendicular to the longitudinal axis of cart 201 (see FIG. 2B and FIG. 3A). In some embodiments, hitch 205 is connected to baler 99 by a pitch connection 206 (e.g., in some embodiments, a first pitch connection 206 is located at the front end of the first arm portion of hitch 205 (i.e., the end closest to the baler) and a second pitch connection 206 is located at the front end of the second arm portion of hitch 205). In some embodiments, pitch connection 206 includes a pinned hinge. In some embodiments, pitch connection 206 is configured to provide a pitch degree of freedom to hitch 205 (and thus cart 201) such that cart 201 can move up and down relative to baler 99 as the terrain varies (e.g., in some embodiments, pitch connection 206 allows cart 201 to float up and down while cart 201 is pulled over hills and through valleys).

In some embodiments, hitch 205 further includes a bolster connection 207 that connects hitch 205 to the main frame 210 of cart 201. In some embodiments, bolster connection 207 is configured to provide a roll degree of freedom to cart 201 such that cart 201 can rotate around the longitudinal axis of cart 201, relative to baler 99, as the terrain varies (e.g., in some embodiments, bolster connection 207 allows cart 201 to rock back and forth as the wheels of cart 201 go over uneven ground). In some embodiments, bolster connection 207 provides the roll degree of freedom via a pin or bolster 208 (see FIG. 3A) that hitch 205 and/or main frame 210 is operable to rotate around (e.g., in some embodiments, the bolster is lubricated with a grease such that a bolster hole or sleeve on hitch 205 and/or main frame 210 can easily rotate around the bolster as the ground over which cart 201 is pulled varies). In some such embodiments, hitch 205 and main frame 210 each have a corresponding bolster hole or sleeve in which the bolster is slid through and then the bolster is locked into place using a bolt or lock pin or other suitable locking mechanism to prevent hitch 205 and main frame 210 from separating from each other. In other such embodiments, the bolster is directly connected to either hitch 205 or main frame 210 (e.g., in some embodiments, the bolster is welded directly to hitch 205 or main frame 210), the bolster is inserted into a bolster hole or sleeve on the corresponding portion of cart 201 that is not directly connected to the bolster, and the bolster is locked into place using a suitable locking mechanism.

In some embodiments, main frame 210 of cart 201 includes a throat 211 that acts as a guide to keep bales from rolling off of the sides of cart 201. In some embodiments, throat 211 is formed by two rails, one on each side of cart 201, that extend along the side of cart 201. In some embodiments, cart 201 includes an overhead back-end frame 212 located at the back end (i.e., the end opposite hitch 205) of cart 201. In some embodiments, overhead frame 212 provides a pathway for the bales to follow when the bales are unloaded from cart 201.

In some embodiments, cart 201 includes an apron-chain conveyor (not shown in FIG. 2A, but visible, e.g., as apron-chain conveyor 115 of FIG. 1) that is used to move bales toward the back and off of cart 201. In some embodiments, the apron-chain conveyor is driven by a hydraulic motor 216 (e.g., in some embodiments, a Char-Lynn® orbit motor such as provided by Eaton Corporation, 1111 Superior Avenue, Cleveland, Ohio 44114-2584; www.eaton.com/Eaton/ProductsServices/ProductsbyCategory/Hydraulics/Motors/Char-LynnGerotorGerolerMotors/index.htm).

In some embodiments, cart 201 includes a tailgate 230 that is configured to keep bales on cart 201 until the bales are ready to be unloaded. In some embodiments, tailgate 230 is further configured to carry a bale during the loading of bales onto cart 201. In some embodiments, tailgate 230 is lifted using tailgate lift 232. In some embodiments, a hydraulic cylinder 231 (e.g., a hydraulic cylinder such as provided by Grainger Industrial Supply, 100 Grainger Parkway, Lake Forest, Ill. 60045-5201) provides the power used to raise and lower tailgate 230 via tailgate lift 232.

In some embodiments, a hydraulic pump used to pump hydraulic fluid to hydraulic motor 216 and/or hydraulic cylinder 231 is mounted on baler 99 and is controlled from the cab of the vehicle (e.g., tractor) that is pulling baler 99 and baler cart 201 (see FIG. 3F). In some such embodiments, the hydraulic system for cart 201 (e.g., in some embodiments, motor 216, cylinder 231, and the hydraulic pump mounted on baler 99) is operated independently from the hydraulic system of the tractor pulling baler 99 and baler cart 201, which allows the hydraulics of cart 201 to be operated without affecting or being affected by the tractor's operation. In other such embodiments, the hydraulic system for cart 201 is powered by the power-take-off (PTO) of the tractor pulling baler 99 and baler cart 201.

In some embodiments, cart 201 includes a pair of caster wheels 220 mounted at the back end of cart 201. In some embodiments, caster wheels 220 are mounted to cart 201 via a pivot connection 221 that allows wheels 220 to swivel.

Figure 2B:
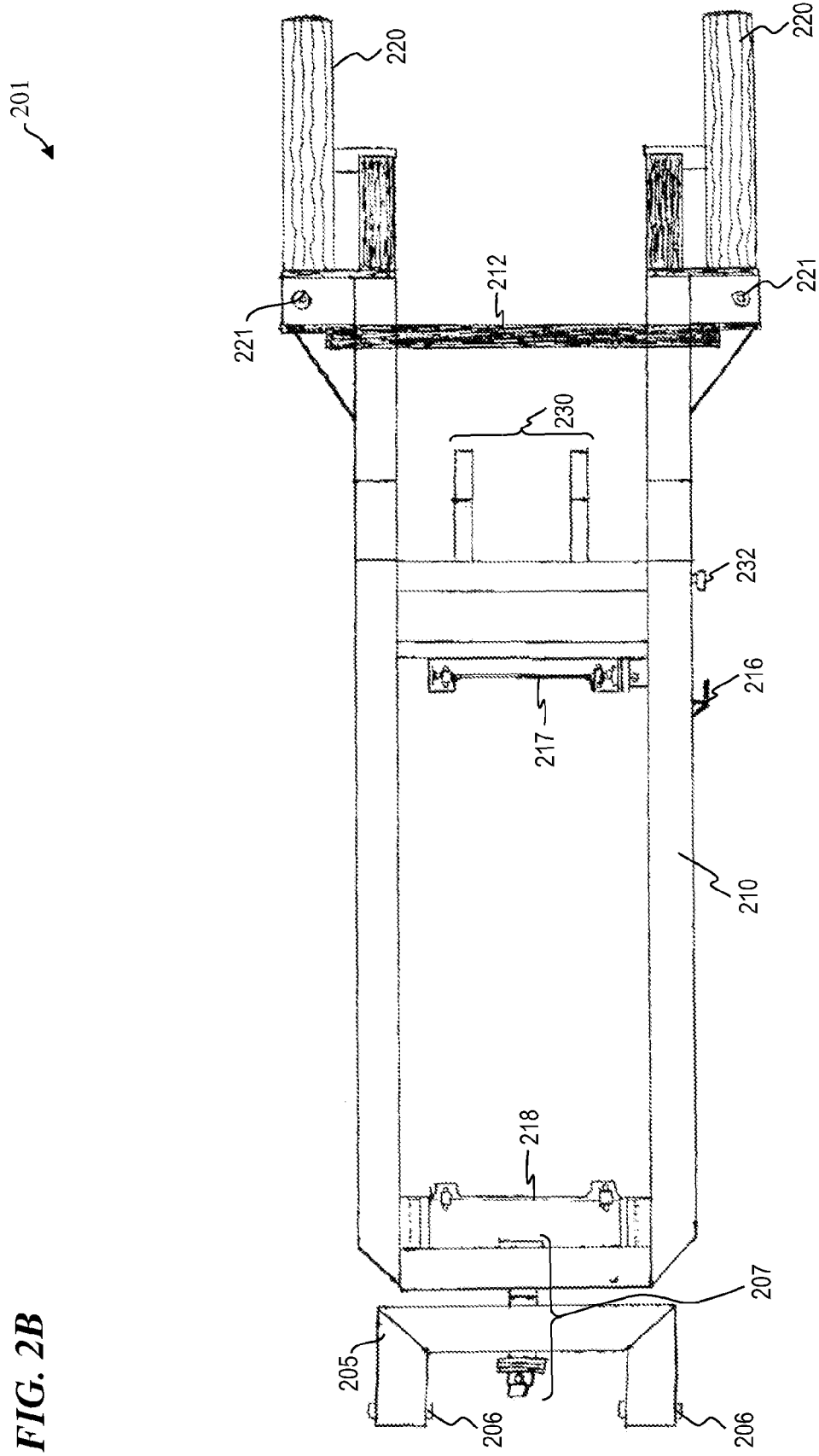
FIG. 2B is a plan view of baler cart 201.

FIG. 2B is a plan view of baler cart 201. In some embodiments, cart 201 includes a drive shaft 217 located near the back end of cart 201 (i.e., the end farthest from hitch 205) and a front shaft 218 located near the front end of cart 201 (i.e., the end closest to hitch 205). In some embodiments, apron-chain conveyor (see, e.g., apron-chain conveyor 515 of FIG. 5C) includes two chains (a first chain connected to a first side of drive shaft 217 and front shaft 218 and a second chain connected to a second, opposite side of drive shaft 217 and front shaft 218) that are connected to each other by a plurality of conveyor supports. In some embodiments, hydraulic motor 216 drives the apron-chain conveyor by turning drive shaft 217, which, in turn, pulls the two chains and conveyor supports of the apron-chain conveyor around drive shaft 217 and front shaft 218.

Figure 3A:
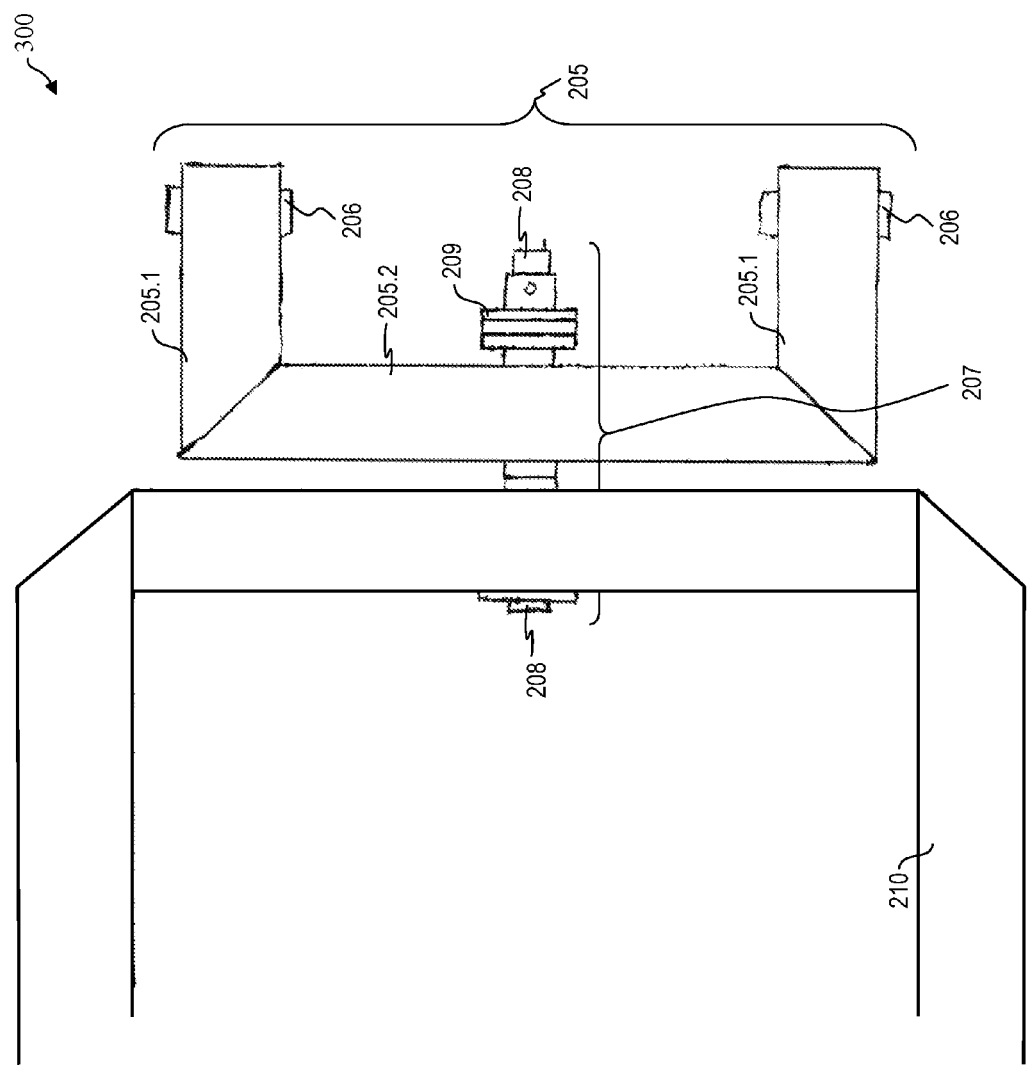
FIG. 3A is a plan view of a connection system 300 associated with hitch 205.

FIG. 3A is a plan view of a connection system 300 associated with hitch 205. The two arm portions of hitch 205 that parallel the longitudinal axis of cart 201 are shown here as a first arm portion 205.1 and a second arm portion 205.1. The third transverse portion that is perpendicular to the longitudinal axis of cart 201 is shown here as transverse portion 205.2. The pin or bolster of bolster connection 207 is shown here as bolster 208, and the locking mechanism used to lock bolster 208 in place such that hitch 205 is operably connected to main frame 210 of cart 201 is shown here as locking mechanism 209.

FIG. 3B is an end view of the front end of main frame 210 of cart 201 showing the roll degree of freedom 302 provided to main frame 210 by bolster connection 207. In some embodiments, as shown by the arrows around bolster connection 207, the sides of main frame 210 are able to rotate up and down around the longitudinal axis of cart 201 (i.e., the axis that runs parallel to the direction of motion of the baler 99 and baler cart 201) as the wheels of cart 201 go over uneven terrain. FIG. 3B shows the roll degree of freedom from the perspective of main frame 210, but, in some embodiments (for example, embodiments where bolster 208 is not directly connected to either hitch 205 or main frame 210), hitch 205 is also provided with roll degree of freedom 302.

FIG. 3C is a side view of hitch 205 and main frame 210 showing the pitch degree of freedom 303 provided to hitch 205 and main frame 210 by pitch connection 206 (FIG. 3C shows a first pitch connection 206 on a first side of hitch 205 and main frame 210, but, in some embodiments, a second pitch connection 206 is located on a second side of hitch 205, opposite the first side). In some embodiments, as shown by the arrows around pitch connection 206, hitch 205 and main frame 210 are able to rotate up and down around the transverse axis of hitch 205 (i.e., the axis that runs perpendicular to the longitudinal axis of cart 201).

Figure 3D:
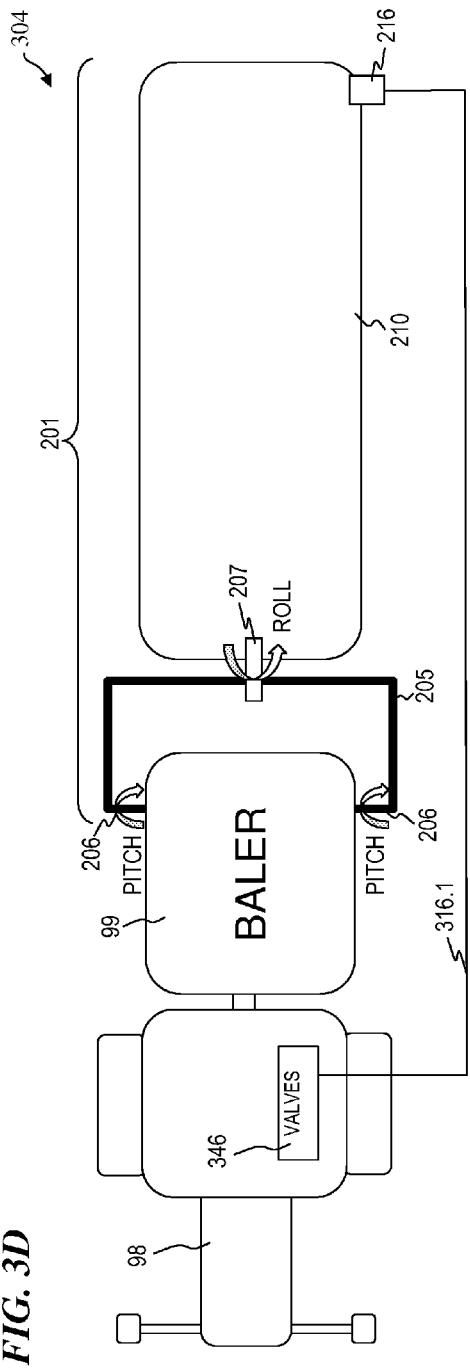
FIG. 3D is a plan view of a baler-cart system 304.

FIG. 3D is a plan view of a baler-cart system 304. In some embodiments, system 304 includes a tractor 98 operatively coupled to a baler 99 and baler cart 201 of FIG. 2B. In some embodiments, system 301 includes hydraulic lines 316.1 that run from hydraulic motor 216 (and/or, in some embodiments, from hydraulic cylinder 231) on the back end of main frame 210 of cart 201 up to a plurality of hydraulic valves 346 located in the cab of tractor 98. In some embodiments, the hydraulic motor(s) (e.g., motor 216) can be activated by hydraulic valves 346 in the cab of the tractor 98 such that hydraulic valves 346 facilitate the operation of the mechanical portions of cart 201 (and of cart 301 of FIG. 3E described below) while the operator is in the cab of the tractor 98.

Figure 3E:
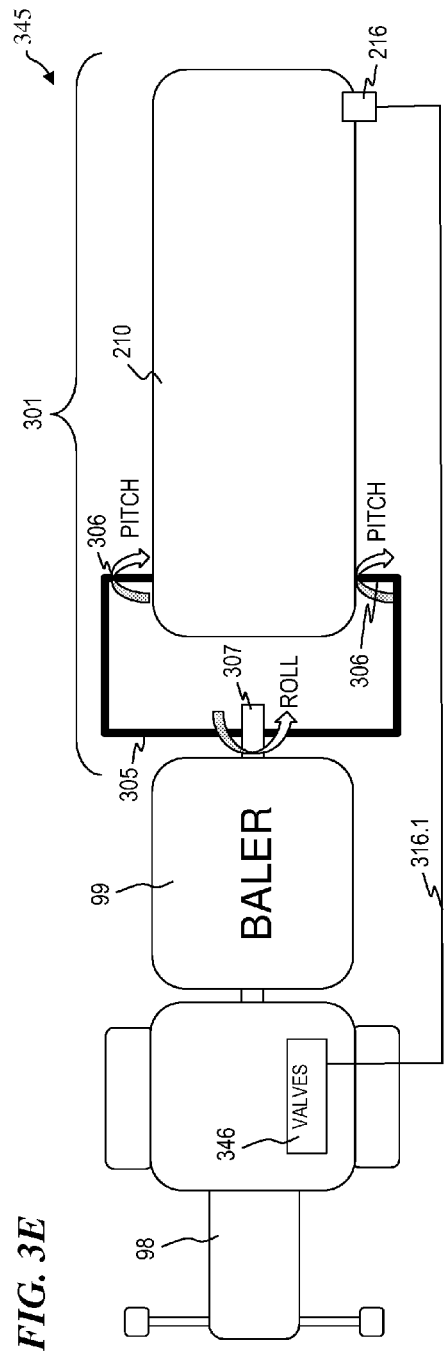
FIG. 3E is a plan view of a baler-cart system 345.

FIG. 3E is a plan view of a baler-cart system 345. In some embodiments, system 345 is identical to system 304 of FIG. 3D except that hitch 205 is replaced with hitch 305 (and thus cart 201 is replaced with cart 301). In some embodiments, hitch 305 has the reverse configuration of hitch 205 (i.e., in some embodiments, a first end of hitch 305 is operatively connected to baler 99 via a bolster connection 307 (instead of via pitch connections 206) that provides the roll degree of freedom to cart 301 relative to baler 99, and a second end of hitch 305 is operatively connected to main frame 210 of cart 301 via pitch connections 306 (instead of via bolster connection 207) that provides the pitch degree of freedom to cart 301 relative to baler 99).

FIG. 3F is a plan view of a baler-cart system 355. In some embodiments, system 355 includes a tractor 98 operatively coupled to a baler 99 and baler cart 201 of FIG. 2B. In some embodiments, system 355 includes hydraulic lines 316.1 that run from hydraulic motor 216 (and/or, in some embodiments, from hydraulic cylinder 231) on the back end of main frame 210 of cart 201 up to a hydraulic pump 357 that is mounted on baler 99. In some embodiments, hydraulic pump 357 is powered by power-source 359. In some embodiments, power-source 359 is a gas motor such that the hydraulics for system 355 (e.g., pump 357 and motor 216) are operated independently from the hydraulic system of the tractor pulling baler 99 and baler cart 201, which allows the hydraulics for system 355 to be operated without affecting or being affected by the tractor's operation. In other embodiments, power-source 359 is the power-take-off (PTO) of the tractor. In some embodiments, pump 357 is a pump with an electronic clutch that allows the pump to be operated only as needed (i.e., on demand), as opposed to more conventional hydraulic pumps that must be kept running constantly (e.g., in some embodiments, pump 357 is a PH SERIES Clutch Pump by Muncie Power 201 East Jackson Street, Muncie, Ind. 47305-2834; www.munciepower.com/products/fluid-power/pf-ph-series-clutch-pumps/?class0=Fluid%20Power&class0_0=9&query=Product%20Class:Product%20Type.eq.Fluid%20Power&back=Products). In some embodiments, hydraulic pump 357 and power-source 359 are operatively connected to electronic controls 358 located in the cab of tractor 98 via connection 358.1 and connection 358.2, respectively, such that hydraulic pump 357 and/or power-source 359 can be activated and controlled by controls 358 (and thus hydraulic motor 216 and/or hydraulic cylinder 231) can be controlled by controls 358 while the operator is in the cab of tractor 98. In some embodiments, connection 358.1 and/or connection 358.2 includes an electrical connection (e.g., wiring). In some embodiments, connection 358.1 and/or connection 358.2 includes an optical connection. In some embodiments, connection 358.1 and/or connection 358.2 includes a wireless connection.

FIG. 3G is a plan view of a baler-cart system 356. In some embodiments, the apron-chain conveyor on cart 201 (e.g., apron-chain conveyor 515 of FIG. 5C) and/or the tailgate on cart 201 (e.g., tailgate 230 of FIG. 2A) are powered by a motor 366 that is mounted directly on cart 201, rather than by the hydraulic system shown in FIGS. 3D-3F. In some embodiments, motor 366 is a gas motor. In some embodiments, motor 366 is an electric motor. In some embodiments, motor 366 is operatively connected to electronic controls 358 located in the cab of tractor 98 via connection 366.1 such that motor 366 (and thus the apron-chain conveyor and/or the tailgate) can be controlled by controls 358 while the operator is in the cab of tractor 98. In some embodiments (as shown in FIG. 3G), connection 366.1 is a wireless connection. In some embodiments, connection 366.1 includes an optical connection. In some embodiments, connection 366.1 includes an electrical connection (e.g., wiring).

Figure 4A:
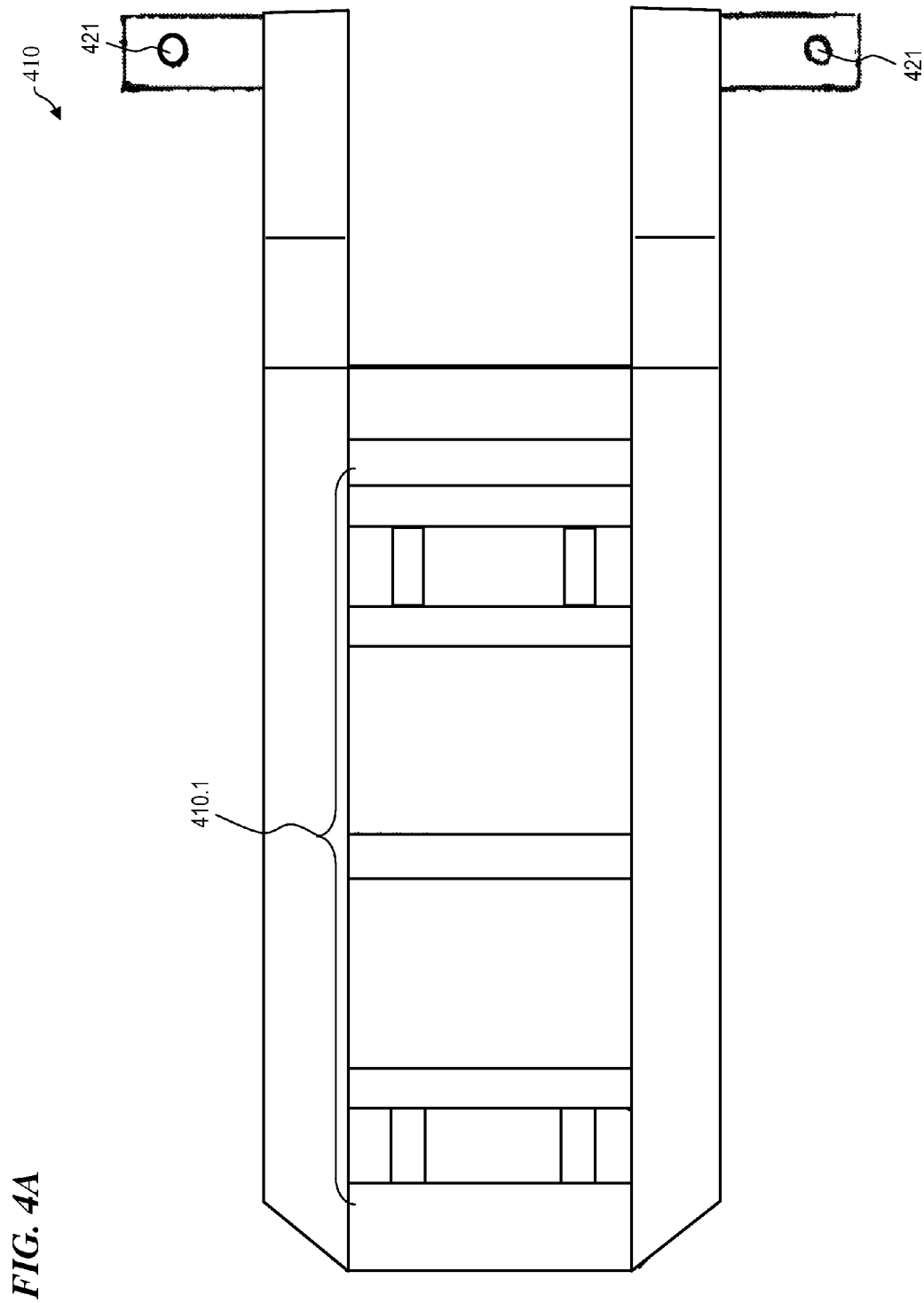
FIG. 4A is a plan view of a main frame 410 for a baler cart suitable for use with any of the baler cart or baler-cart systems described in the present application.

FIG. 4A is a plan view of a main frame 410 for a baler cart suitable for use with any of the baler cart or baler-cart systems described in the present application. In some embodiments, main frame 410 is identical to main frame 210 of FIG. 2A. In some embodiments, main frame 410 includes a plurality of cross members 410.1 configured to provide transverse support to main frame 410. In some embodiments, main frame 410 includes pivot connections 421 that are configured to allow wheels connected to connections 421 to swivel.

Figure 4B:
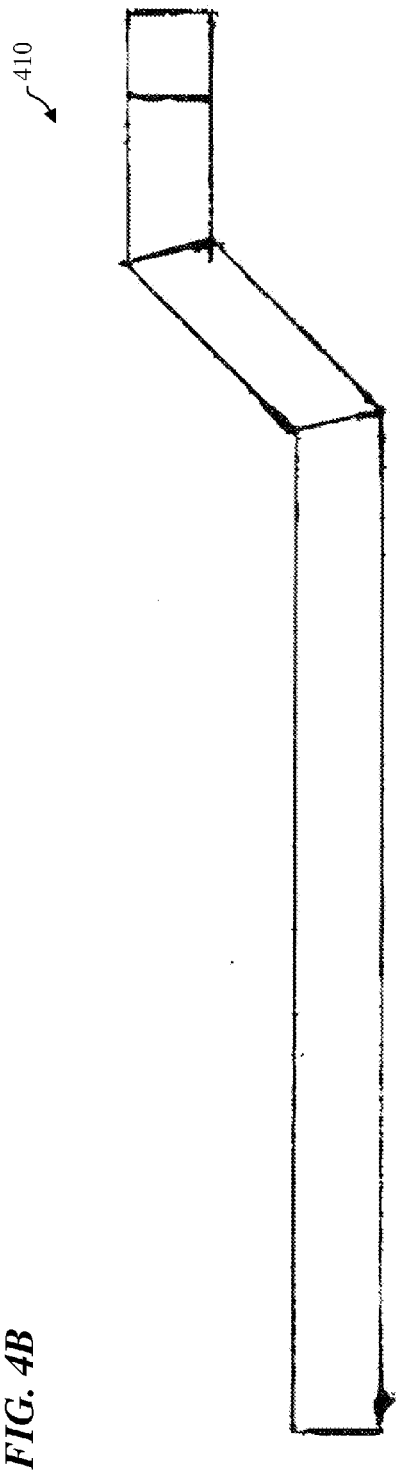
FIG. 4B is a side view of main frame 410.

FIG. 4B is a side view of main frame 410. In some embodiments, frame 410 is made from box-shaped tubular steel or iron pieces having a dimension of about 10 centimeters (cm) (4-inches) square with a wall thickness of about 0.5 cm (3/16 inches). In other embodiments, frame 410 is made from any other suitable combination of materials and material sizes.

Figure 4C:
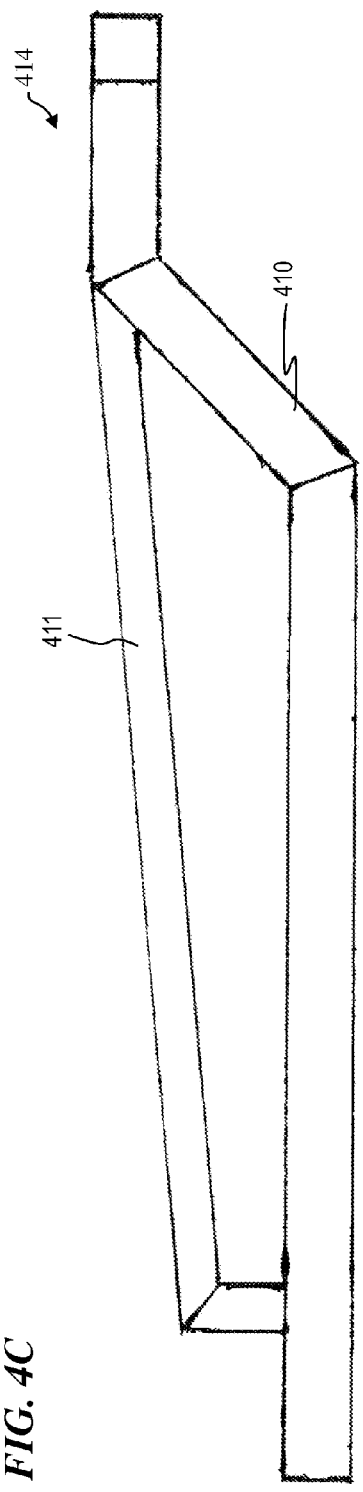
FIG. 4C is a side view of a main frame configuration 414 that includes main frame 410 and a throat 411.

FIG. 4C is a side view of a main frame configuration 414 that includes main frame 410 and a throat 411. In some embodiments, throat 411 is identical to throat 211 of FIG. 2A. In some embodiments, throat 411 is made from box-shaped tubular steel or iron pieces having a dimension of about 5 by 7.6 cm (about 2 by 3 inches). In other embodiments, throat 411 is made from any other suitable combination of materials and material sizes.

Figure 5A:
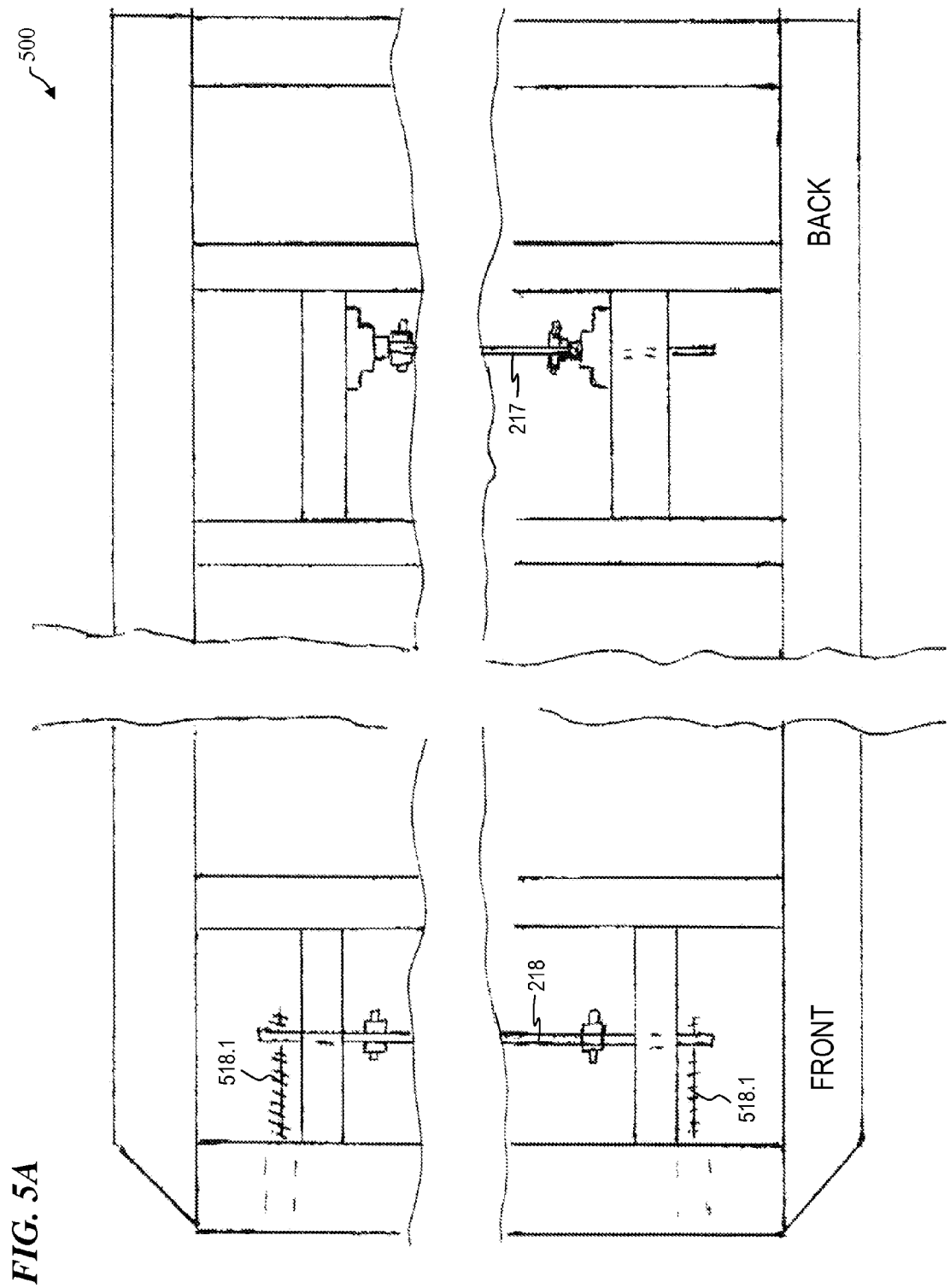
FIG. 5A is a plan view of a shaft configuration 500 suitable for use with any of the baler cart or baler-cart systems described in the present application.

FIG. 5A is a plan view of a shaft configuration 500 suitable for use with any of the baler cart or baler-cart systems described in the present application. In some embodiments, configuration 500 includes drive shaft 217 and front shaft 218 of FIG. 2B. In some embodiments, front shaft 218 has about a 3.8-cm (1.5-inch) diameter and includes #C55 8-tooth sprockets on brass bushings (in some embodiments, a set of sprockets is located on each side of front shaft 218). In some embodiments, front shaft 218 includes idler tensioners 518.1 configured to provide adjustable tension to the chains of the apron-chain conveyor rotating around front shaft 218 and drive shaft 217 (in some such embodiments, configuration 500 includes a first idler tensioner 518.1 located on a first side of front shaft 218 and a second idler tensioner 518.1 located on a second, opposite side of front shaft 218). In some embodiments, each idler tensioner 518.1 includes a 1.27 cm (½-inch) diameter threaded rod configured to be adjustably screwed into a 1.27 cm (½-inch) cross hole in front shaft 218 in order to adjust the tension of the apron-chain conveyor. In some embodiments, drive shaft 217 is on bearings, has a 3.81 cm (1½-inch) diameter, and includes #C55 8-tooth sprockets keyed to each end of drive shaft 217. In some embodiments, the idler tensioners 518.1, sprockets, bearings, and/or bushings for shaft configuration 500 are provided by AMEC Industry Inc., 1805 E. Francis Street, Ontario, Canada 91761 (www.amecind.com/).

Figure 5B:
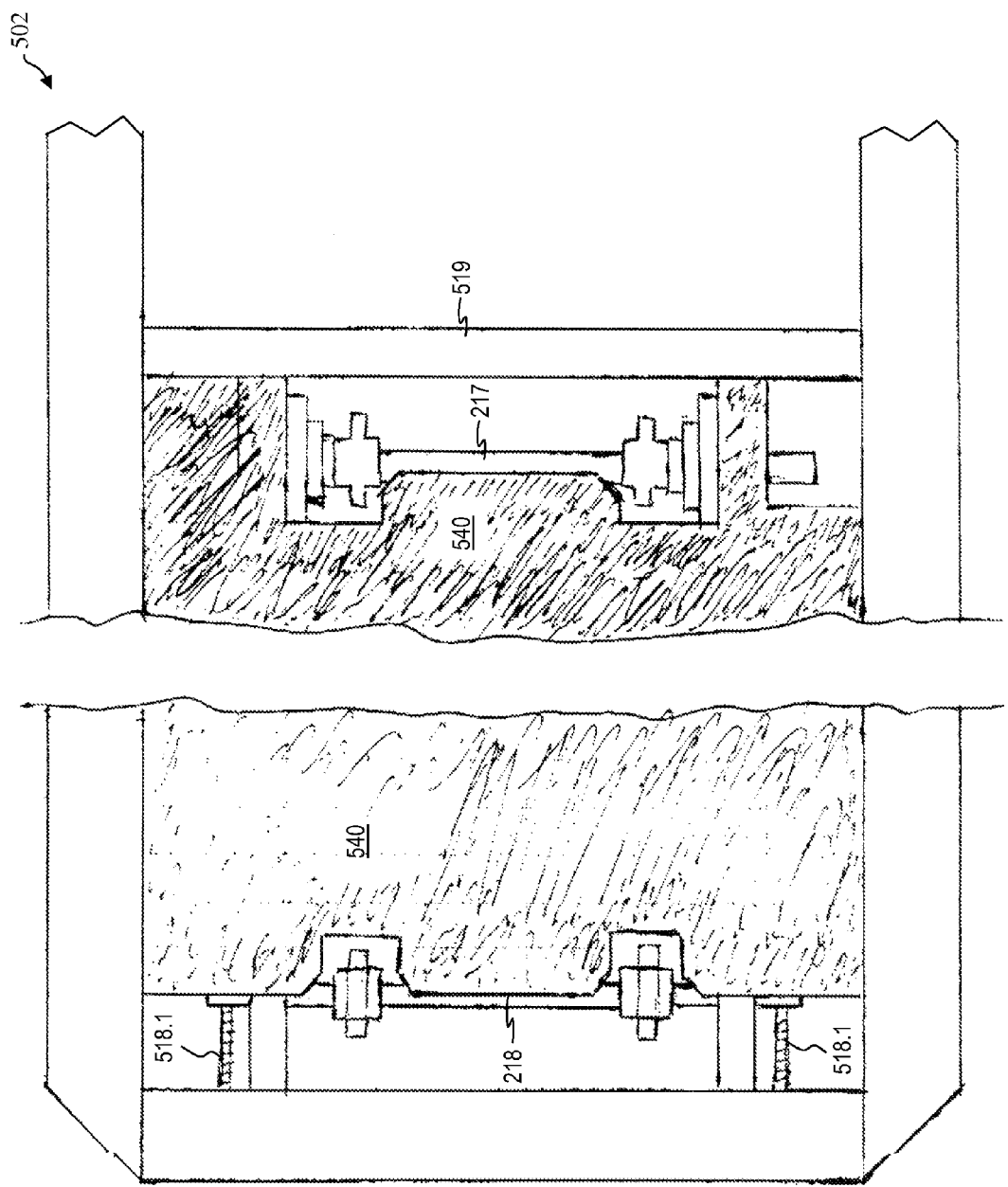
FIG. 5B is a plan view of a floor configuration 502 suitable for use with any of the baler cart or baler-cart systems described in the present application.

FIG. 5B is a plan view of a floor configuration 502 suitable for use with any of the baler cart or baler-cart systems described in the present application. In some embodiments, floor surface 540 of configuration 502 provides a smooth surface for the apron-chain conveyor and bales to ride on. In some embodiments, floor configuration 502 includes a bumper 519 configured to keep bales on tailgate 230 and away from the apron-chain conveyor.

Figure 5C:
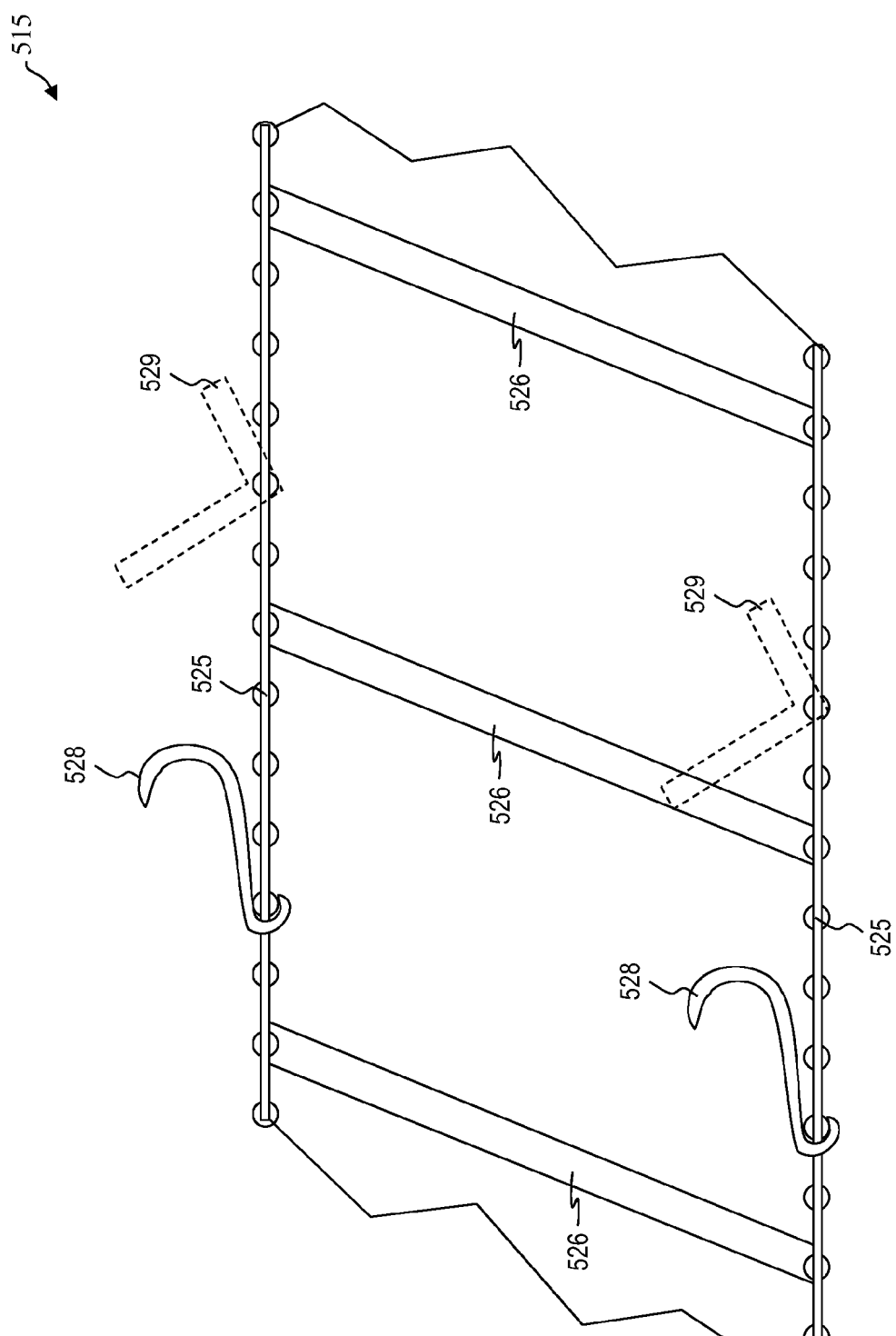
FIG. 5C is a perspective view of an apron-chain conveyor 515 suitable for use with any of the baler cart or baler-cart systems described in the present application.

FIG. 5C is a perspective view of an apron-chain conveyor 515 suitable for use with any of the baler cart or baler-cart systems described in the present application. In some embodiments, apron-chain conveyor 515 is identical to apron-chain conveyor 115 of FIG. 1. In some embodiments, apron-chain conveyor 515 is motorized (e.g., in some embodiments, conveyor 515 is powered by hydraulic motor 216) and configured to move bales to the back end of cart 201 and/or unload bales from cart 201 without requiring the operator to leave the vehicle and without requiring that the back end of cart 201 be lower in elevation than the front end of cart 201. In some embodiments, apron-chain conveyor 515 includes two sets of chain links 525 and a plurality of conveyor supports 526 that are connected between the two sets of chain links 525. In some embodiments, apron-chain conveyor is provided by Northern Chain Specialties Inc., 7329 Chief Road Kaleva, Mich. 49645 (www.northernchain.com/Apron-ConveyorChain.aspx). In some embodiments, (e.g., when the bales are too heavy to move with the apron-chain conveyor itself) apron-chain conveyor 515 further includes dogs/pawls 528 and/or dogs/pawls 529 that are configured to dig into or grasp the bales deposited on baler cart 201 in order to assist apron-chain conveyor 515 in moving the bales toward the back end of baler cart 201.

FIG. 6A is an end view of an overhead back-end frame 612 suitable for use with any of the baler cart or baler-cart systems described in the present application. In some embodiments, overhead frame 612 is identical to overhead frame 212 of FIG. 2A. In some embodiments, overhead frame 612 is made from box-shaped tubular steel or iron pieces having a dimension of about 5 by 7.6 cm (about 2 by 3 inches).

FIG. 6B is an end view of an overhead back-end frame configuration 614 suitable for use with any of the baler cart or baler-cart systems described in the present application. In some embodiments, configuration 614 includes overhead back-end frame 612 attached (e.g., in some embodiments, welded) to cart 201 near pivot connections 221 and wheels 220 at the back end (i.e., the end opposite hitch 205) of cart 201.

Figure 6C:
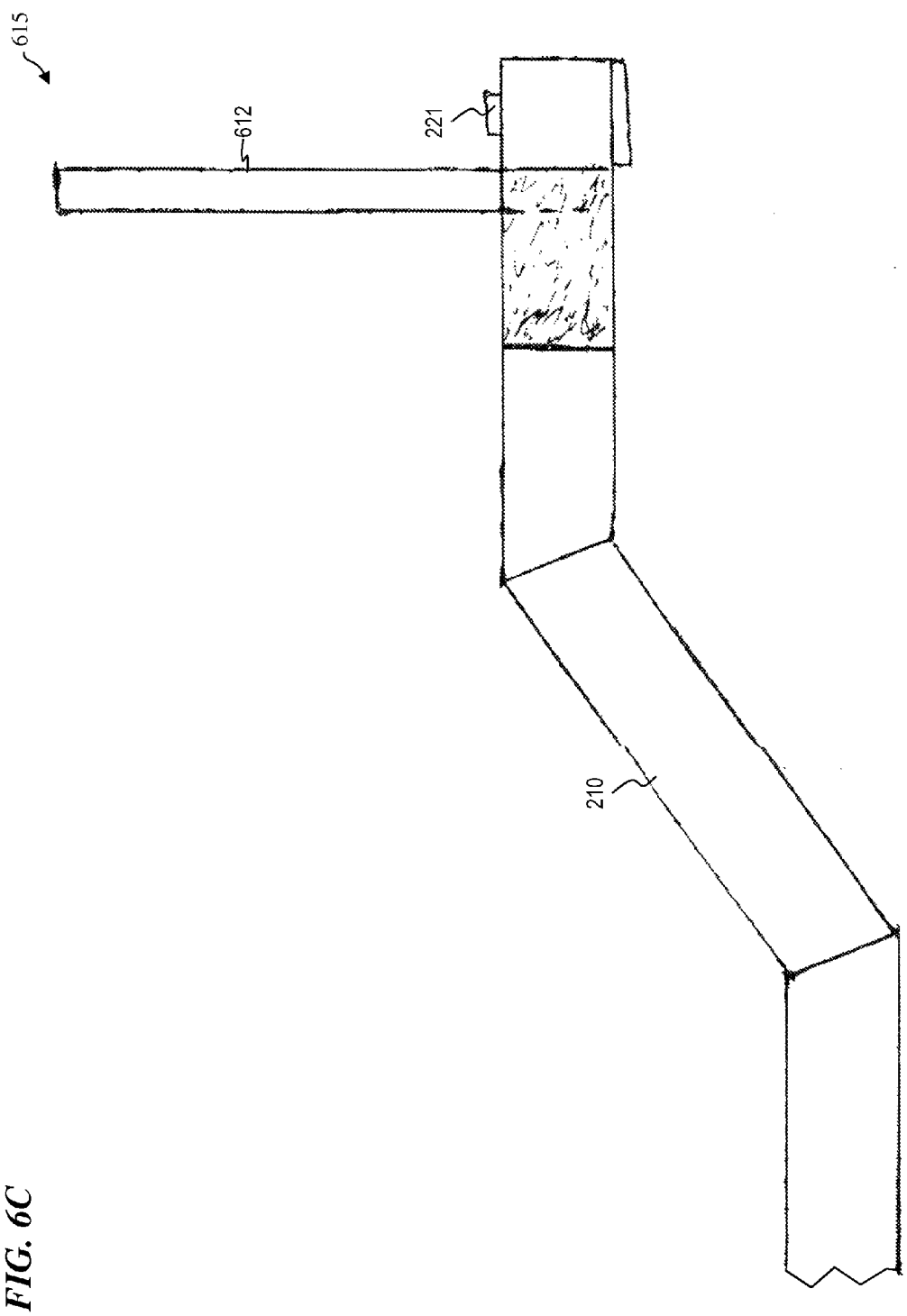
FIG. 6C is a side view of overhead back-end frame configuration 614.

FIG. 6C is a side view of overhead back-end frame configuration 614. In some embodiments, overhead frame 612 is attached (e.g., in some embodiments, welded) to main frame 210 of cart 201 near pivot connections 221 at the back end (i.e., the end opposite hitch 205) of cart 201.

Figure 7A:
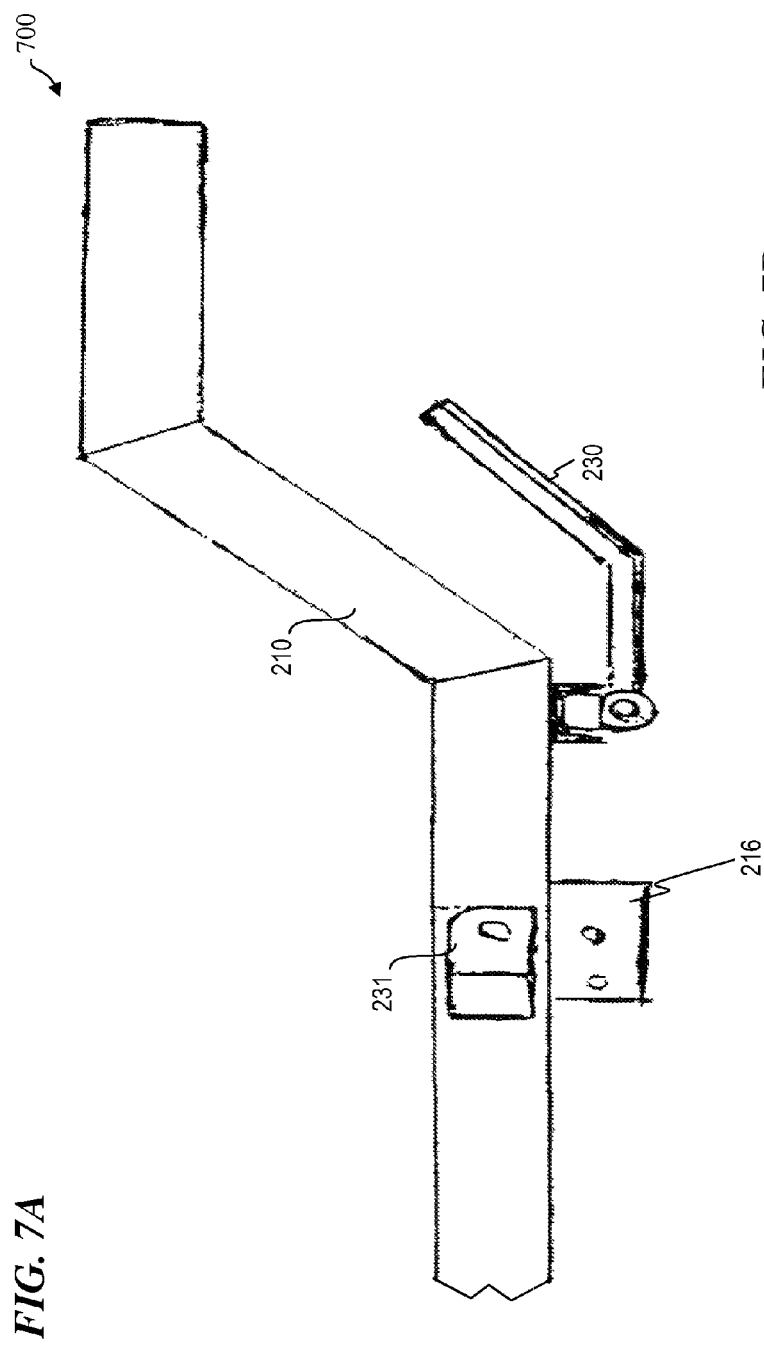
FIG. 7A is a side view of a tailgate configuration 700 suitable for use with any of the baler cart or baler-cart systems described in the present application.

FIG. 7A is a side view of a tailgate configuration 700 suitable for use with any of the baler cart or baler-cart systems described in the present application. In some embodiments, tailgate configuration 700 includes tailgate 230, hydraulic motor 216, and hydraulic cylinder 231 of FIG. 2A. In some embodiments, tailgate 230, hydraulic motor 216, and hydraulic cylinder 231 are all mounted on main frame 210 of baler cart 201.

Figure 7B:
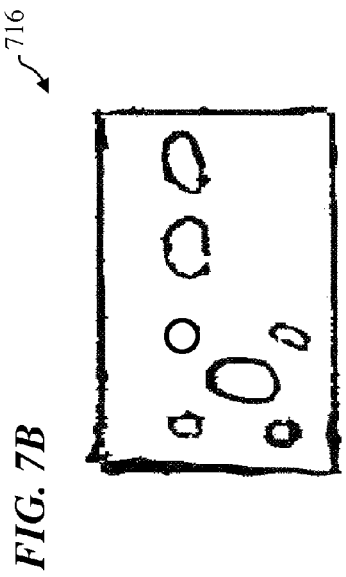
FIG. 7B is a side view of a hydraulic orbit motor 716.

FIG. 7B is a side view of a hydraulic orbit motor 716. In some embodiments, hydraulic orbit motor 716 is identical to hydraulic motor 216. In some embodiments, orbit motor 716 is mounted to main frame 210 of baler cart 201 with a bracket that includes tension slots for adjusting the tension of orbit motor 716.

FIG. 7C is a side view of a tailgate configuration 735. In some embodiments, tailgate configuration 735 includes tailgate 730 and tailgate lift 732. In some embodiments, tailgate 730 is identical to tailgate 230 and tailgate lift 732 is identical to tailgate lift 232. In some embodiments, lift 732 is operatively connected to hydraulic cylinder 231 of FIG. 2A such that hydraulic cylinder 231 provides the power to raise and lower tailgate 230 via tailgate lift 732.

FIG. 7D is a side view of a tailgate lift configuration 740. In some embodiments, configuration 740 includes a lower tailgate lift portion 741 and an upper tailgate lift portion 742. In some embodiments, tailgate lift configuration 740 is identical to tailgate lift 732 of FIG. 7C and tailgate lift 232 of FIG. 2A.

FIG. 7E is a side view of upper tailgate lift portion 742.

FIG. 7F is a plan view of tailgate configuration 735.

Figure 7G:
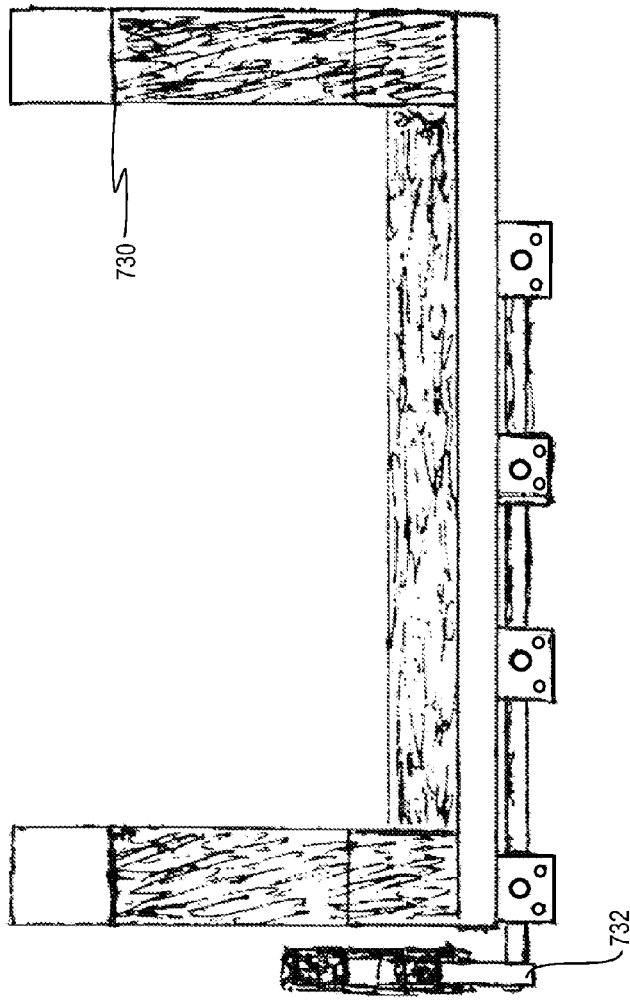
FIG. 7G is an end view of tailgate configuration 735.

FIG. 7G is an end view of tailgate configuration 735.

Figure 7H:
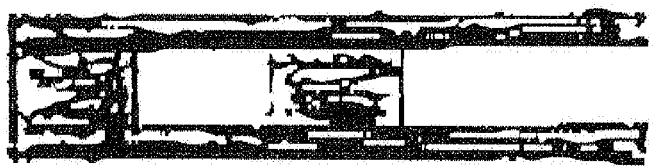
FIG. 7H is an end view of tailgate lift 732.

FIG. 7H is an end view of tailgate lift 732.

Figure 8B:
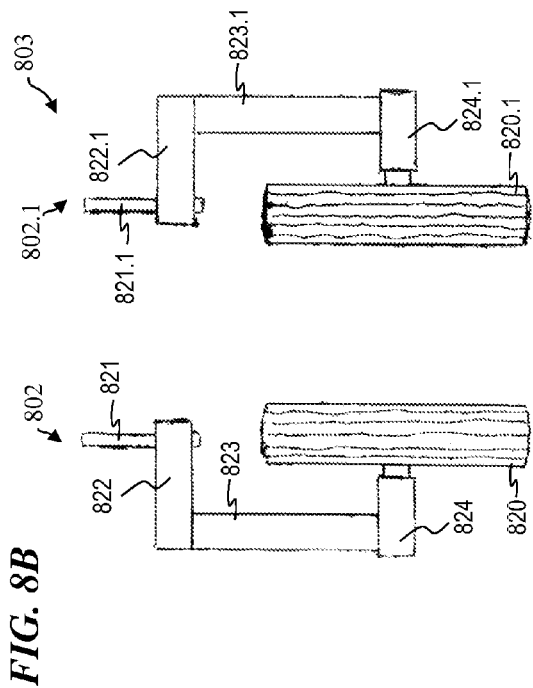
FIG. 8B is an end view of caster-wheel structures 802 and 802.1 in a wheel configuration 803.
Figure 8D:
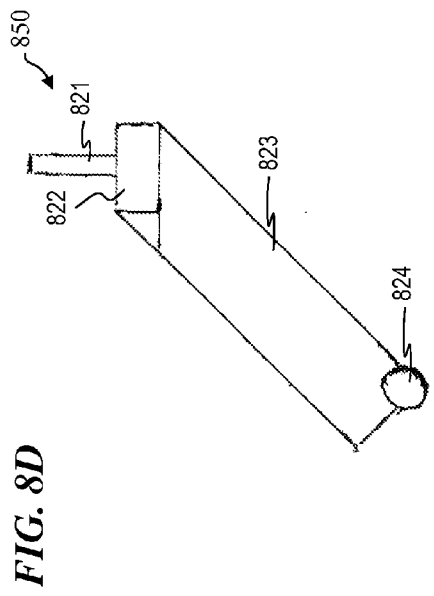
FIG. 8D is a side view of a three-piece wheel frame 850.
Figure 8A:
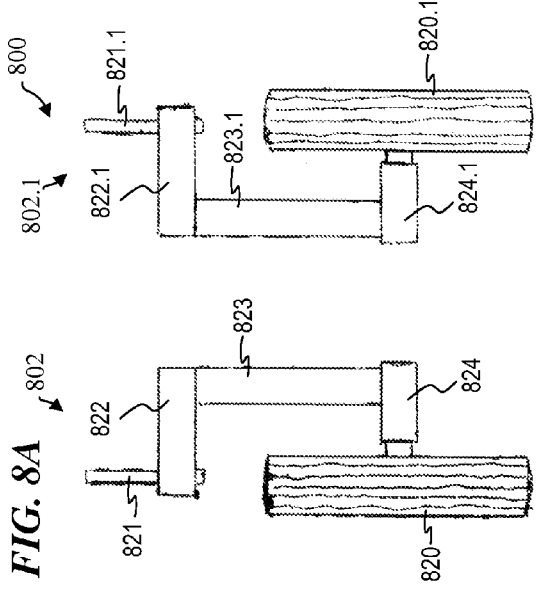
FIG. 8A is an end view of a pair of caster-wheel structures 802 and 802.1 in a wheel configuration 800.

FIG. 8A is an end view of a pair of caster-wheel structures 802 and 802.1 in a wheel configuration 800. In some embodiments, caster-wheel structures 802 and 802.1 are equivalent to, or interchangeable with, the wheel structures described for cart 201 of FIG. 2A and/or cart system 100 of FIG. 1. In some embodiments, wheel configuration 800 (i.e., where wheels 820 and 820.1 are facing outward away from the baler cart) occurs when baler cart 201 is being pulled in a forward direction (i.e., the baler is being pulled forward) due to trailing arm 823. In some embodiments, caster-wheel structure 802 is connected to the back-left side of cart 201 as viewed from the back end of cart 201, and caster-wheel structure 802.1 is connected to the back-right side of cart 201 as viewed from the back end of cart 201. In some embodiments, caster-wheel structure 802 includes wheel 820, pivot connection 821 (in some embodiments, wheel 820 is identical to wheel 220 of FIG. 2A and pivot connection 821 is identical to pivot connection 221 of FIG. 2A), and a three-piece wheel frame that includes transverse arm 822, trailing arm 823, and axle arm 824. In some embodiments, the upper portion of trailing arm 823 is pointing toward the front end of baler cart 201 when cart 201 is in wheel configuration 800. In some embodiments, caster-wheel structure 802.1 includes wheel 820.1, pivot connection 821.1 (in some embodiments, wheel 820.1 is identical to wheel 220 of FIG. 2A and pivot connection 821.1 is identical to pivot connection 221 of FIG. 2A), and a three-piece wheel frame that includes transverse arm 822.1, trailing arm 823.1, and axle arm 824.1.

FIG. 8B is an end view of caster-wheel structures 802 and 802.1 in a wheel configuration 803. In some embodiments, wheel configuration 803 (i.e., where wheels 820 and 820.1 are facing in toward the baler cart) occurs when baler cart 201 is being pushed in a backwards direction (i.e., the baler is being pushed backwards), again due to the trailing-arm 823. In some embodiments, the upper portion of trailing arm 823 is pointing toward the back end of baler cart 201 when cart 201 is in wheel configuration 803.

Figure 8C:
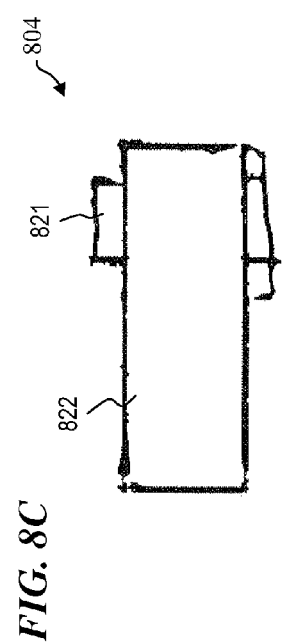
FIG. 8C is an end view of a pivot configuration 804.

FIG. 8C is an end view of a pivot configuration 804. In some embodiments, configuration 804 includes pivot connection 821 located within transverse arm 822.

FIG. 8D is a side view of a three-piece wheel frame 850. In some embodiments, frame 850 represents the frame used for wheel structure 802 (i.e., the wheel structure on the left side of cart 201 as viewed from the back end of cart 201). In some embodiments, frame 850 includes pivot connection 821, transverse arm 822, trailing arm 823, and axle arm 824.

In some embodiments, the present invention provides a cart for collecting and unloading agricultural bales, the cart including a cart body; a hitch, wherein the hitch includes a first end that is configured to operatively connect to a baler and a second end that is configured to operatively connect to the cart body, wherein the hitch provides a pitch degree of freedom to the cart relative to the baler, and wherein the hitch provides a roll degree of freedom to the cart relative to the baler; an automated conveyor device operatively connected to the cart body and configured to move the agricultural bales to a back end of the cart body; and at least one wheel operatively connected to the cart body, wherein the at least one wheel is configured to swivel.

In some embodiments, the cart body includes a plurality of side rails, wherein each one of the plurality of side rails is configured to prevent the bales from rolling off of a side of the cart body.

In some embodiments, the hitch includes a bolster connection located at the second end of the hitch that provides the roll degree of freedom to the cart relative to the baler, and wherein the hitch includes a pinned-hinge connection located at the first end of the hitch that provides the pitch degree of freedom to the cart relative to the baler.

In some embodiments, the automated conveyor device includes a motorized apron-chain conveyor. In some embodiments, the apron-chain conveyor includes a plurality of pawls configured to grasp the bales to facilitate movement of the bales toward the back end of the cart body. In some embodiments, the apron-chain conveyor is powered by a hydraulic motor controlled by hydraulic valves in a cab of a tractor being used to pull the baler and cart. In some embodiments, the apron-chain conveyor includes a tensioner configured to provide adjustable tension to the apron-chain conveyor.

In some embodiments, the automated conveyor device includes a motorized apron-chain conveyor, wherein the apron-chain conveyor is powered by a hydraulic motor that is operatively coupled to a hydraulic pump mounted on the baler, wherein the hydraulic pump is electronically controlled from a cab of a tractor being used to pull the baler and cart, and wherein the hydraulic pump and the hydraulic motor are operated independently from a hydraulic system of the tractor.

In some embodiments, the cart further includes a tailgate operatively coupled to the back end of the cart body and configured to have an open position and a closed position, wherein the tailgate is configured to prevent the bales from falling off of the back end of the cart when the tailgate is in the closed position, and wherein the tailgate is configured to facilitate the bales being moved off of the cart when the tailgate is in the open position. In some embodiments, the tailgate is altered between the open position and the closed position by a hydraulic-cylinder lift controlled by hydraulic valves in a cab of a tractor being used to pull the baler and cart.

In some embodiments, the cart further includes a tailgate operatively coupled to the back end of the cart body and configured to have an open position and a closed position, wherein the tailgate is configured to prevent the bales from falling off of the back end of the cart when the tailgate is in the closed position, wherein the tailgate is configured to facilitate the bales being moved off of the cart when the tailgate is in the open position, and wherein the tailgate is altered between the open position and the closed position by a hydraulic-cylinder lift that is operatively coupled to a hydraulic pump mounted on the baler, wherein the hydraulic pump is electronically controlled from a cab of a tractor being used to pull the baler and cart, and wherein the hydraulic pump and the hydraulic-cylinder lift are operated independently from a hydraulic system of the tractor.

In some embodiments, the cart body includes an overhead frame member located at the back end of the cart body and configured to provide a pathway for the bales to follow when the bales are unloaded from the cart.

In some embodiments, the present invention provides a method for collecting and unloading agricultural bales, the method including providing a baler; providing a cart; operatively connecting the cart to the baler such that the cart has a roll degree of freedom relative to the baler and such that the cart has a pitch degree of freedom relative to the baler; discharging agricultural bales from the baler onto the cart; motorized conveying the bales toward a back end of the cart; and unloading the bales from the cart by motorized conveying the bales off of the cart.

In some embodiments, the cart includes a hitch and a cart body, wherein the operatively connecting of the cart to the baler includes operatively connecting a first end of the hitch to the baler such that the pitch degree of freedom is provided to the cart relative to the baler, and wherein the operatively connecting of the cart to the baler further includes operatively connecting a second end of the hitch to the cart body such that the roll degree of freedom is provided to the cart relative to the baler.

In some embodiments, the cart includes a hitch, a cart body, and a bolster connection, wherein the operatively connecting of the cart to the baler includes operatively connecting a first end of the hitch to the baler such that the pitch degree of freedom is provided to the cart relative to the baler, and wherein the operatively connecting of the cart to the baler includes operatively connecting a second end of the hitch to the cart body using the bolster connection such that the roll degree of freedom is provided to the cart relative to the baler.

In some embodiments, the motorized conveying of the bales includes hydraulically conveying the bales toward the back end of the cart.

In some embodiments, the method further includes selectively preventing bales on the cart from falling off the back end of the cart during a first mode of operation, and selectively facilitating movement of the bales off of the back end of the cart in a second mode of operation.

In some embodiments, the present invention provides a system for collecting and unloading agricultural bales, the system including a baler; a cart; means for operatively connecting the cart to the baler such that the cart has a roll degree of freedom relative to the baler and such that the cart has a pitch degree of freedom relative to the baler; and means for automatically conveying bales on the cart toward a back end of the cart.

In some embodiments, the cart includes a hitch and a cart body, wherein the means for operatively connecting the cart to the baler includes means for operatively connecting a first end of the hitch to the baler such that the pitch degree of freedom is provided to the cart relative to the baler, and wherein the means for operatively connecting the cart to the baler further includes means for operatively connecting a second end of the hitch to the cart body such that the roll degree of freedom is provided to the cart relative to the baler.

In some embodiments, the means for motorized conveying the bales includes means for hydraulically conveying the bales toward the back end of the cart.

In some embodiments, the system further includes means for selectively preventing the bales from falling off of the back end of the cart in a first mode of operation; and means for selectively facilitating movement of the bales off of the back end of the cart in a second mode of operation.

In some embodiments, the system further includes means for controlling the means for automatically conveying from a cab of a tractor being used to pull the baler and cart.

In some embodiments, the present invention provides a cart for collecting and unloading one or more agricultural bales, the cart including a cart body; a hitch, wherein the hitch includes a first end that is configured to operatively connect to a baler and a second end that is configured to operatively connect to the cart body, wherein the first end of the hitch provides a pitch degree of freedom to the cart, and wherein the second end of the hitch provides a roll degree of freedom to the cart; an automated conveyor device operatively connected to the cart body and configured to move the agricultural bales to a back end of the cart body; and at least one wheel operatively connected to the cart body, wherein the at least one wheel is configured to swivel.

In some embodiments, the cart body includes a plurality of side rails, wherein each one of the plurality of side rails is configured to prevent the bales from rolling off of a side of the cart body.

In some embodiments, the hitch includes a bolster connection located at the second end of the hitch, and wherein the bolster connection provides the roll degree of freedom to the cart.

In some embodiments, the automated conveyor device includes an apron-chain conveyor. In some embodiments, the apron-chain conveyor includes a plurality of pawls configured to grasp the bales such that the bales can be moved toward the back end of the cart body even when the apron-chain conveyor is unable to move the bales without assistance from the plurality of pawls. In some embodiments, the apron-chain conveyor is powered by a hydraulic orbit motor. In some embodiments, the apron-chain conveyor includes a tensioner configured to provide adjustable tension to the apron-chain conveyor.

In some embodiments, the cart further includes a tailgate operatively coupled to the back end of the cart body and configured to have an open position and a closed position, wherein the tailgate is configured to prevent the bales from rolling off of the back end of the cart when the tailgate is in the closed position, and wherein the tailgate is configured to allow the bales to be moved off of the cart when the tailgate is in the open position. In some embodiments, the tailgate is altered between the open position and the closed position by a hydraulic-cylinder lift.

In some embodiments, the cart body includes an overhead frame member located at the back end of the cart body and configured to provide a pathway for the bales to follow when the bales are unloaded from the cart.

In some embodiments, the present invention provides a method for collecting and unloading agricultural bales, the method including providing a baler; providing a cart; operatively connecting the cart to the baler such that the cart has a roll degree of freedom relative to the baler and such that the cart has a pitch degree of freedom relative to the baler; discharging one or more agricultural bales from the baler onto the cart; and unloading the one or more bales from the cart by automatically conveying the bales toward a back end of the cart and off of the cart.

In some embodiments, the providing of the cart includes providing a hitch and a cart body, wherein the operatively connecting of the cart to the baler includes operatively connecting a first end of the hitch to the baler such that the pitch degree of freedom is provided to the cart, and wherein the operatively connecting includes operatively connecting a second end of the hitch to the cart body such that the roll degree of freedom is provided to the cart.

In some embodiments, the providing of the cart includes providing a hitch, a cart body, and a bolster connection, wherein the operatively connecting of the cart to the baler includes operatively connecting a first end of the hitch to the baler such that the pitch degree of freedom is provided to the cart, and wherein the operatively connecting includes operatively connecting a second end of the hitch to the cart body using the bolster connection such that the roll degree of freedom is provided to the cart.

In some embodiments, the automatically conveying of the bales includes hydraulically conveying the bales toward the back end of the cart and off of the cart.

In some embodiments, the method further includes providing a tailgate operatively connected to the back end of the cart, wherein the unloading of the one or more bales includes lowering the tailgate into an open position such that the bales can be conveyed off of the cart.

In some embodiments, the present invention provides a system for collecting and unloading agricultural bales, the system including a baler; a cart; means for operatively connecting the cart to the baler such that the cart has a roll degree of freedom relative to the baler and such that the cart has a pitch degree of freedom relative to the baler; and means for motorized conveying bales that are discharged onto the cart toward a back end of the cart.

In some embodiments, the cart includes a hitch and a cart body, wherein the means for operatively connecting the cart to the baler includes means for operatively connecting a first end of the hitch to the baler such that the pitch degree of freedom is provided to the cart, and wherein the means for operatively connecting includes means for operatively connecting a second end of the hitch to the cart body such that the roll degree of freedom is provided to the cart.

In some embodiments, the means for motorized conveying the bales includes means for hydraulically conveying the bales toward the back end of the cart.

In some embodiments, the means for motorized conveying the bales includes means for hydraulically conveying the bales toward the back end of the cart, wherein the means for hydraulically conveying the bales operates independently from a hydraulic system of a tractor being used to pull the baler and the cart.

In some embodiments, the system further includes means for selectively preventing the bales from rolling off of the back end of the cart. In some embodiments, the system further includes hydraulic means for selectively preventing the bales from rolling off of the back end of the cart.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects. It is further to be understood that the individual components of the embodiments described above can be interchanged with each other such that components from separately described embodiments and/or Figures can be combined and/or omitted to create additional embodiments of the present invention.

What is claimed is:

1. A cart for collecting and unloading agricultural bales, the cart comprising:
    a cart body;
    a hitch, wherein the hitch includes a first end that is configured to operatively connect to a baler and a second end that is configured to operatively connect to the cart body, wherein the hitch provides a pitch degree of freedom to the cart relative to the baler, and wherein the hitch provides a roll degree of freedom to the cart relative to the baler;
    an automated conveyor device operatively connected to the cart body and configured to move the agricultural bales to a back end of the cart body; and
    at least one wheel operatively connected to the cart body, wherein the at least one wheel is configured to swivel, wherein the automated conveyor device includes a motorized apron-chain conveyor, wherein the apron-chain conveyor is powered by a hydraulic motor that is operatively coupled to a hydraulic pump mounted on the baler, wherein the hydraulic pump is electronically controlled from a cab of a tractor being used to pull the baler and cart, and wherein the hydraulic pump and the hydraulic motor are operated independently from a hydraulic system of the tractor.

2. The cart of claim 1, wherein the cart body includes a plurality of side rails, wherein each one of the plurality of side rails is configured to prevent the bales from rolling off of a side of the cart body.

3. The cart of claim 1, wherein the hitch includes a bolster connection located at the second end of the hitch that provides the roll degree of freedom to the cart relative to the baler, and wherein the hitch includes a pinned-hinge connection located at the first end of the hitch that provides the pitch degree of freedom to the cart relative to the baler.

4. The cart of claim 1, wherein the apron-chain conveyor includes a plurality of pawls configured to grasp the bales to facilitate movement of the bales toward the back end of the cart body.

5. The cart of claim 1, wherein the apron-chain conveyor includes a tensioner configured to provide adjustable tension to the apron-chain conveyor.

6. The cart of claim 1, further comprising a tailgate operatively coupled to the back end of the cart body and configured to have an open position and a closed position, wherein the tailgate is configured to prevent the bales from falling off of the back end of the cart when the tailgate is in the closed position, and wherein the tailgate is configured to facilitate the bales being moved off of the cart when the tailgate is in the open position.

7. The cart of claim 1, wherein the cart body includes an overhead frame member located at the back end of the cart body and configured to provide a pathway for the bales to follow when the bales are unloaded from the cart.

8. The cart of claim 1, wherein the cart body includes a bumper configured to keep conveyed bales away from the apron-chain conveyor.

9. The cart of claim 1, further comprising a wireless connection between electronic controls in the cab of the tractor and the hydraulic pump, wherein the hydraulic pump is electronically controlled from the cab of the tractor via the wireless connection.

10. The cart of claim 1, wherein the hydraulic pump includes an electronic clutch such that the hydraulic pump can be operated on demand.

11. A cart for collecting and unloading agricultural bales, the cart comprising:
   a cart body;
   a hitch, wherein the hitch includes a first end that is configured to operatively connect to a baler and a second end that is configured to operatively connect to the cart body, wherein the hitch provides a pitch degree of freedom to the cart relative to the baler, and wherein the hitch provides a roll degree of freedom to the cart relative to the baler;
   an automated conveyor device operatively connected to the cart body and configured to move the agricultural bales to a back end of the cart body;
   at least one wheel operatively connected to the cart body, wherein the at least one wheel is configured to swivel;
   a tailgate operatively coupled to the back end of the cart body and configured to have an open position and a closed position, wherein the tailgate is configured to prevent the bales from falling off of the back end of the cart when the tailgate is in the closed position, wherein the tailgate is configured to facilitate the bales being moved off of the cart when the tailgate is in the open position, and wherein the tailgate is altered between the open position and the closed position by a hydraulic-cylinder lift that is operatively coupled to a hydraulic pump mounted on the baler, wherein the hydraulic pump is electronically controlled from a cab of a tractor being used to pull the baler and cart, and wherein the hydraulic pump and the hydraulic-cylinder lift are operated independently from a hydraulic system of the tractor.

12. The cart of claim 11, wherein the cart body includes a plurality of side rails, wherein each one of the plurality of side rails is configured to prevent the bales from rolling off of a side of the cart body.

13. The cart of claim 11, wherein the hitch includes a bolster connection located at the second end of the hitch that provides the roll degree of freedom to the cart relative to the baler, and wherein the hitch includes a pinned-hinge connection located at the first end of the hitch that provides the pitch degree of freedom to the cart relative to the baler.

14. The cart of claim 11, wherein the automated conveyor device includes a motorized apron-chain conveyor.

15. The cart of claim 11, wherein the automated conveyor device includes a motorized apron-chain conveyor, and wherein the apron-chain conveyor includes a plurality of pawls configured to grasp the bales to facilitate movement of the bales toward the back end of the cart body.

16. The cart of claim 11, wherein the automated conveyor device includes a motorized apron-chain conveyor, and wherein the apron-chain conveyor includes a tensioner configured to provide adjustable tension to the apron-chain conveyor.

17. The cart of claim 11, wherein the cart body includes an overhead frame member located at the back end of the cart body and configured to provide a pathway for the bales to follow when the bales are unloaded from the cart.

18. The cart of claim 11, wherein the cart body includes a bumper configured to keep conveyed bales away from the apron-chain conveyor.

19. The cart of claim 11, further comprising a wireless connection between electronic controls in the cab of the tractor and the hydraulic pump, wherein the hydraulic pump is electronically controlled from the cab of the tractor via the wireless connection.

20. The cart of claim 11, wherein the hydraulic pump includes an electronic clutch such that the hydraulic pump can be operated on demand.

* * * * *